(12) United States Patent
Nangeroni et al.

(10) Patent No.: US 6,183,814 B1
(45) Date of Patent: *Feb. 6, 2001

(54) COATING GRADE POLYLACTIDE AND COATED PAPER, PREPARATION AND USES THEREOF, AND ARTICLES PREPARED THEREFROM

(75) Inventors: James Nangeroni, Doylestown, PA (US); Mark H. Hartmann, Minnetonka, MN (US); Matthew L. Iwen, Richfield, MN (US); Christopher Michael Ryan, Maple Grove, MN (US); Jeffrey J. Kolstad, Wayzata, MN (US); Kevin T. McCarthy, Bloomington, MN (US)

(73) Assignee: Cargill, Incorporated, Minneapolis, MN (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/862,612

(22) Filed: May 23, 1997

(51) Int. Cl.$^7$ ............... B05D 1/26; B32B 27/10
(52) U.S. Cl. ........... 427/361; 427/365; 427/374.1; 428/481
(58) Field of Search ............... 428/481; 427/407.1, 427/361, 365, 374.1

(56) References Cited

U.S. PATENT DOCUMENTS

| | | | |
|---|---|---|---|
| 5,142,023 | 8/1992 | Gruber et al. | 528/354 |
| 5,180,765 | 1/1993 | Sinclair | 524/306 |
| 5,216,050 | 6/1993 | Sinclair | 524/108 |
| 5,247,059 | 9/1993 | Gruber et al. | 528/354 |

(List continued on next page.)

FOREIGN PATENT DOCUMENTS

| | | |
|---|---|---|
| 0 699 800 A2 | 3/1996 | (EP) . |
| 2277324 | 10/1994 | (GB) . |
| WO 90/01521 | 2/1990 | (WO) . |
| WO 92/04413 | 3/1992 | (WO) . |
| WO 94/06856 | 3/1994 | (WO) . |
| WO 94/08090 | 4/1994 | (WO) . |
| WO 95/18169 | 6/1995 | (WO) . |
| WO 96/40031 | 12/1996 | (WO) . |

OTHER PUBLICATIONS

A. Södergård & Näsman, Stabilization of poly(L–lactide) in the melt, Polymer Degradation and Stability, v. 46, pp. 25–30 (1994).

A. Södergård, A Stability Study of Poly(L–lactide) in the Melt, Annual Transactions of the Nordic Rheology Society, v. 3, pp. 6–8 (1995).

LaVerne Leonard, Editor, *Plastics Compounding 1995/1996 Redbook*, Advanstar Communications, Inc., pp. 26–30 (1995).

A.J. Nijenhuis, et al., Crosslinked poly(L–lactide) and poly(ε–caprolactone), Polymer, v. 7, No. 13, pp. 2783–2791 (1996).

A. Södergård, et al., Changes in Peroxide Melt–Modified Poly(L–lactide), Ind. Eng. Chem. Res., v. 34, pp. 1203–1207 (1995).

(List continued on next page.)

*Primary Examiner*—Shrive Beck
*Assistant Examiner*—Jennifer Kolb
(74) *Attorney, Agent, or Firm*—Merchant & Gould

(57) ABSTRACT

A coated paper product including a paper layer and a polymer layer, wherein the polymer layer includes a polylactide polymer composition having a ratio of Mz to Mn of greater than about 6. The polymer composition, when melted, exhibits a die swell of greater than about 1.25 for a melt flow index of greater than about 2. Polymer lactide compositions, methods of manufacturing the polymer composition and the coated paper product, and articles produced therefrom are also described.

45 Claims, 8 Drawing Sheets

U.S. PATENT DOCUMENTS

| | | | |
|---|---|---|---|
| 5,252,642 | | 10/1993 | Sinclair et al. ......................... 524/108 |
| 5,274,073 | | 12/1993 | Gruber et al. ......................... 528/354 |
| 5,294,483 | * | 3/1994 | Beavers et al. ....................... 428/336 |
| 5,338,822 | | 8/1994 | Gruber et al. ......................... 528/354 |
| 5,359,026 | | 10/1994 | Gruber et al. ......................... 528/354 |
| 5,360,663 | * | 11/1994 | Moteki et al. ......................... 428/290 |
| 5,424,346 | | 6/1995 | Sinclair ................................ 524/108 |
| 5,444,113 | | 8/1995 | Sinclair et al. ......................... 524/306 |
| 5,475,080 | * | 12/1995 | Gruber et al. ......................... 528/354 |
| 5,484,881 | | 1/1996 | Gruber et al. ......................... 528/354 |
| 5,498,385 | * | 3/1996 | Yabusa et al. ...................... 264/171.23 |
| 5,502,158 | | 3/1996 | Sinclair et al. ......................... 528/354 |
| 5,525,706 | | 6/1996 | Gruber et al. ......................... 528/354 |
| 5,536,807 | | 7/1996 | Gruber et al. ......................... 528/354 |
| 5,540,962 | * | 7/1996 | Suskind ................................ 428/34.2 |
| 5,594,095 | | 1/1997 | Gruber et al. ......................... 528/354 |
| 5,679,421 | * | 10/1997 | Brinton, Jr. ............................ 428/34.3 |
| 5,798,435 | * | 8/1998 | Gruber et al. ......................... 528/354 |
| 5,849,401 | * | 12/1998 | El-Afandi et al. ................... 428/215 |

OTHER PUBLICATIONS

International Symposium on "Biodegradable Materials" Oct. 7–9, 1996 in Hamburg, Germany Niemi, et al., Melt–Processable Poly–L–Lactide, p. 34; and A. Södergård, et al., Environmental Degradation of Peroxide Modified Poly(L–lactide), pp. 112–113.

S. McCarthy, Project Manager for Research Projects: Biodegradable Foams; Extrusion Foam from PLA, presentation given to Biodegradable Polymer Research Center, University of Massachussetts–Lowell, Oct. 14–15, 1996.

A. Södergård, et al., XPS Study of the Catalytic Tin in Poly(L–Lactide), Polymer Preprint, v. 37(1), pp. 685–686 (1996).

A. Södergård, et al., Hydrolytic degradation of peroxide modified poly(L–lactide), Polymer Degradation and Stability, v. 51, pp. 351–359 (1996).

Dialkyl Peroxides, Organic Peroxides Product Bulletin, elf atochem.

* cited by examiner

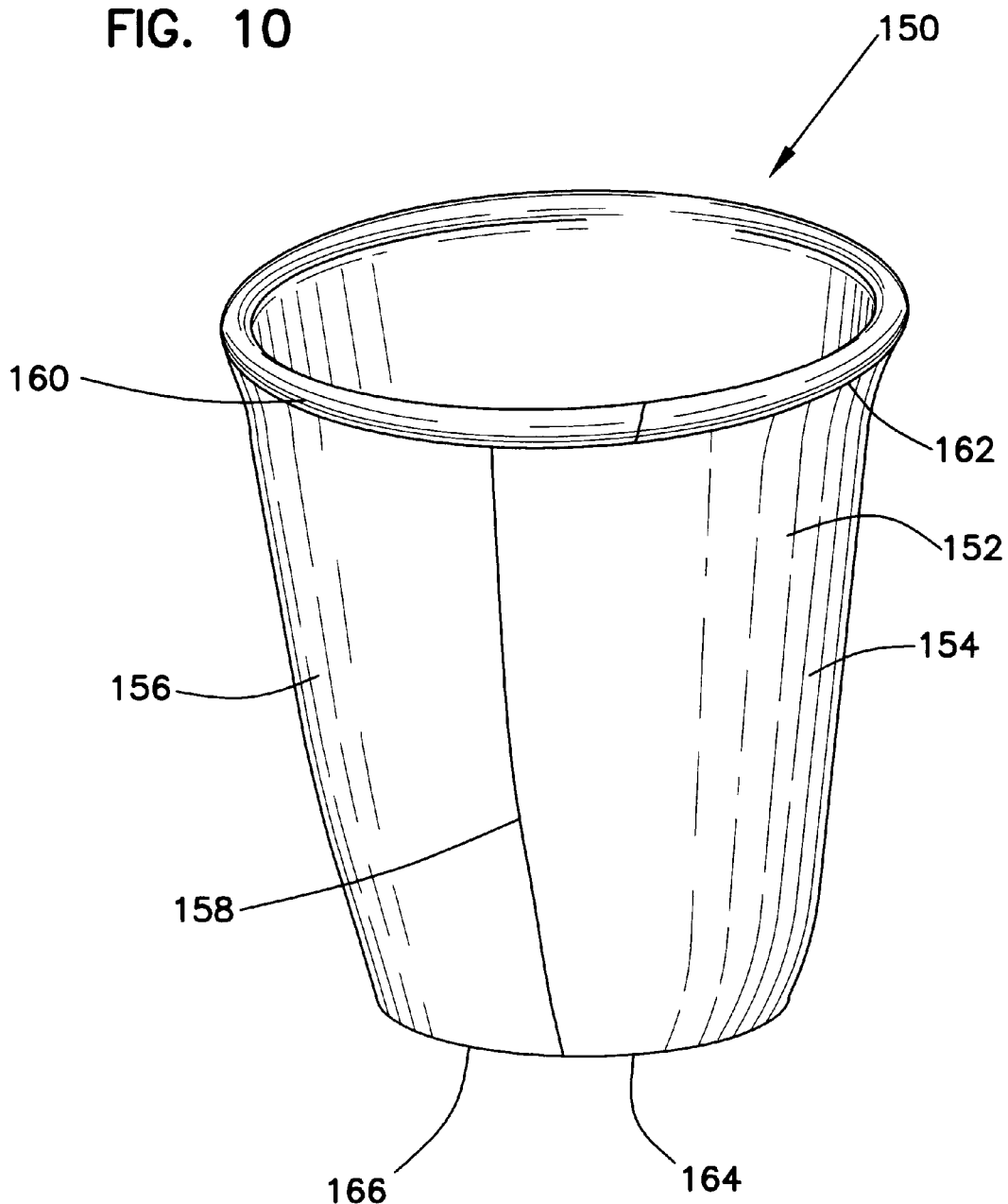

COATING GRADE POLYLACTIDE AND COATED PAPER, PREPARATION AND USES THEREOF, AND ARTICLES PREPARED THEREFROM

FIELD OF THE INVENTION

The present invention concerns paper coating technology. It concerns general techniques, methods, and materials relating to coating paper with a degradable polymer, especially a polylactide polymer composition, and to articles manufactured from the coated paper.

BACKGROUND OF THE INVENTION

In recent years, attention has focused on preferred degradable polymers, which can be converted to desired substrates or articles. Much of this attention is focused on polymers which include, as monomeric units therein, the result of lactic acid or lactide polymerization. Attention is directed, for example, to U.S. Pat. No. 5,142,023 to Gruber et al.; U.S. Pat. No. 5,338,822 to Gruber et al.; U.S. Pat. No. 5,475,080 to Gruber et al.; U.S. Pat. No. 5,359,026 to Gruber; and U.S. Pat. No. 5,594,095 to Gruber et al. the complete disclosures of which are incorporated herein by reference. It is noted that U.S. Pat. Nos. 5,142,023; 5,338,822; 5,475,080; 5,359,026; and 5,594,095 are owned by Cargill Incorporated, of Minneapolis, Minn. Cargill Incorporated is the assignee of the present application as well.

Other published documents which concern polymers of lactic acid or lactide include: International Publication No. WO 94/06856 to Sinclair et al., published Mar. 31, 1994; International Publication No. WO 92/04413 to Sinclair et al., published Mar. 19, 1992; and International Publication No. WO90/01521 to Sinclair et al., published Feb. 22, 1990.

Paper coated with either polymeric or wax coatings is desirable because it may increase the strength of the paper stock, impart water resistance, enhance gloss, and/or improve barrier properties. Polypropylene is a common polymer used in paper coating processes. See *Film Extrusion Manual*, TAPPI Press, 1992, ISBN:0-89852-250-1.

In light of depleting sources of cellulosic fiber over the last decade, repulping of paper and the reuse of the cellulosic fiber recovered in the repulping process has accelerated. A typical repulping process involves mechanical agitation of the paper. Often the repulsing environment involves water, heat or other harsh conditions such as an acidic or alkaline solution. A problem that occurs with repulping coated paper is the disposal or recycling of the coating which is liberated during the repulp process. Furthermore, papers coated with certain polymers, such as, polyethylene, are not easily repulped since polyethylene is typically not broken down by the conditions of the repulping process.

Coatings have been developed which are represented to be "repulpable." These are materials which purportedly have adequate properties as paper coatings, and when exposed to conditions of repulping, either dissolve or disperse. In a solution or dispersion, it is claimed that these materials will pass through screens and other filtering steps and pass out with the waste water before the repulping step. Although these coatings have been extensively used, many problems have been encountered with their use. Often the coatings are not clear or glossy. Some coatings may also be unduly sensitive to water.

Disposal is a major problem associated with both repulpable and non-repulpable coating. For coatings which are recovered during the repulp process, there is no value in the recovered material if it must be disposed of in a landfill. For the coatings which pass through the filters and screens in the repulp process, these materials end up in the waste water and may pose a problem for the waste water treatment plants.

Polylactide polymers have been used to coat paper products. See U.S. Pat. No. 5,475,080. Polylactide polymers are advantageous because, once they are separated from the paper, they can be composted. Alternatively, the entire coated paper product can be composted. In order to meet projected needs for biodegradable packaging materials, others have endeavored to optimize lactide polymer processing systems. Gruber et al. (U.S. Pat. No. 5,142,023) disclose a continuous process for the manufacture of lactide polymers with controlled optical purity from lactic acid having physical properties suitable for replacing present petrochemical-based polymers.

Generally, manufacturers of polymers utilizing processes such as those disclosed by Gruber et al. will convert raw material monomers into polymer beads, resins or other pelletized or powdered products. The polymer in this forms is then sold to end users who convert, i.e., extrude, blow-mold, cast films, blow films, thermoform, injection-mold or fiber-spin the polymer at elevated temperatures to form useful articles. The above processes are collectively referred to as melt-processing. Polymers produced by processes such as those disclosed by Gruber et al., which are to be sold commercially as beads, resins, powders or other non-finished solid forms are generally referred to collectively as polymer resins.

SUMMARY OF THE INVENTION

A coated paper product is provided by the present invention. The coated paper product includes a paper layer and a polymer layer. The polymer layer comprises a polylactide polymer composition having a ratio of $M_z$ to $M_n$ of greater than about 6. In a preferred embodiment, the polylactide polymer is a peroxide modified polylactide polymer prepared by compounding polylactide polymer with an alkyl peroxide. The polymer layer can be prepared from a melted polylactide polymer composition exhibiting a die swell of greater than about 1.25 for a melt flow index of greater than about 2.

A method for coating paper is provided by the present invention. The method includes steps of: (a) providing polylactide polymer containing pellets having a crystallinity of greater than about 10 J/g; (b) melting the pellets to provide melted polylactide polymer composition having a die swell of greater than about 1.25 for a melt flow index of greater than about 2; and (c) extrusion coating the melted polylactide polymer composition onto a substrate to provide a coated substrate. It should be understood that alternative methods of coating paper are additionally disclosed, including, proximity or slot coating.

The invention is additionally directed to a polylactide polymer composition and methods for the preparation of the polylactide polymer composition. Generally, the polylactide polymer composition can be referred to as a "coating grade polylactide" because it can be processed on conventional paper coating equipment normally used for coating paper with polyethylene. A preferred method of preparing the coating grade polylactide is by peroxide modification of linear polylactide or viscosity modified polylactide. A preferred way of characterizing coating grade polylactide is as a polymer composition which has a ratio of $M_z$ to $M_n$ of greater than about 6, and which, when melted, exhibits a die swell of greater than about 1.4 for a melt flow index of greater than about 2.

Articles of manufacture which incorporate the coated paper product are also part of this invention. Such articles of manufacture include boxes, cups, plates, butter and margarine wraps, pet food sacks or boxes, burger wraps, and butcher wraps. An advantage of the coated paper product to the invention is that it can be used adjacent to food because it can be GRAS. Furthermore, the polylactide polymer coating can exhibit desirable heat seal properties which allow it to be used without adhesives. In addition, the coating can provide desirable grease resistance and barrier properties.

BRIEF DESCRIPTION OF THE DRAWINGS

FIG. 10 is a perspective view of a paper cup including a polylactide polymer coating according to the present invention.

DETAILED DESCRIPTION OF THE DRAWINGS

Figure 1:
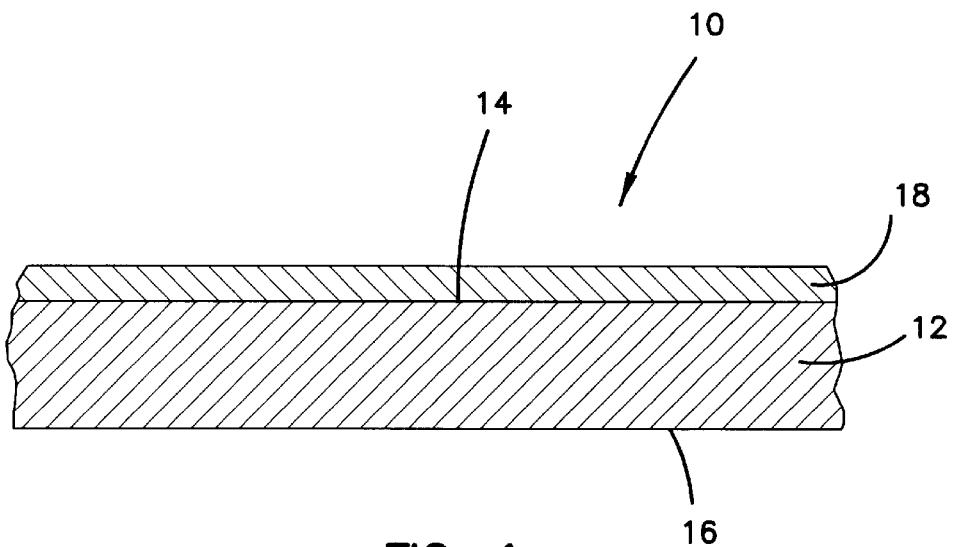
FIG. 1 is a cross-sectional view of a coated paper product according to the principles of the present invention.

The present invention concerns paper coating technology and how it can be used to provide coated paper and desirable articles from coated paper. In particular, the present invention relates to the preparation and use of coated paper having a coating layer prepared from polylactide polymer composition to provide desirable characteristics.

Applicants have found that by controlling the melt stability, melt elasticity, and melt viscosity of polylactide polymer, commercial paper coating equipment can be adapted for coating paper with polylactide. A polylactide polymer composition which has been modified or adapted for processing on commercial or conventional paper coating equipment may be referred to herein as "coating grade polylactide." It should be understood that this phrase is meant to exclude generally linear polylactide polymer compositions which would not be readily processable on commercial or conventional paper coating equipment.

The concept of polylactide melt-stability has a number of facets including molecular weight degradation, lactide reformation, and yellowing. In general, techniques including reducing the lactide or lactic acid level of the polymer to below equilibrium values, the removal of catalyst or reduction of catalyst level, and the introduction of catalyst deactivators contribute to reducing lactide reformation. These techniques are described in U.S. Pat. No. 5,475,080 at, in particular, columns 7–8 and 14–15, the disclosure at these locations being incorporated herein by reference. In addition, stabilizers can be introduced to reduce lactide reformation and to reduce yellowing over time. Tartaric acid has been found to be useful for reducing lactide reformation, and phosphite stabilizers have been found useful for reducing yellowing over time. The polymer can be dried to help reduce molecular weight degradation during processing.

Melt elasticity refers to the ability to run polylactide polymer composition on commercial extrusion coating equipment while being able to draw the polymer composition down to thin coatings with minimal neck-in at high velocities at the high temperatures required for good adhesion to paper. The requirements of melt elasticity in relation to polyethylene coating operations is well known. See Michael, Raj S., "Influence of Molecular Weight Distribution on Low-Density Polyethylene Coating Performance" Vol. 77, No. 6, Tappi Journal 1994, pages 188–192. It is believed that melt elasticity in polylactide polymer composition is related to the extent or degree of chain entanglement. Preferred techniques for enhancing chain entanglement or molecular interaction for polylactide polymers are described in U.S. Pat. No. 5,594,095, the entire disclosure of which is incorporated herein by reference.

Melt viscosity is a measure of the ability of molten polymer to flow under an applied force. In the context of the present invention, it is desirable for the melt viscosity, as measured by melt flow index, to be a value which allows the melted polymer to adhere to the paper surface and which allows desired throughput. Generally, as the melt viscosity increases, the throughput decreases because of increased die pressure. Furthermore, increased melt viscosity tends to require increased polymer temperatures which tends to increase degradation of the polylactide polymer.

The following discussion focuses on the paper coating process of the present invention; the processing characteristics which can be modified to provide a desired commercial product; and on the characteristics of a desired commercial product. Attention then focuses on the materials which can be advantageously used to provide coating grade polylactide, and on the articles which can be manufactured from the coated paper product.

I. Paper Coating

A) Coated Paper and Processes for Manufacture

Figure 2:
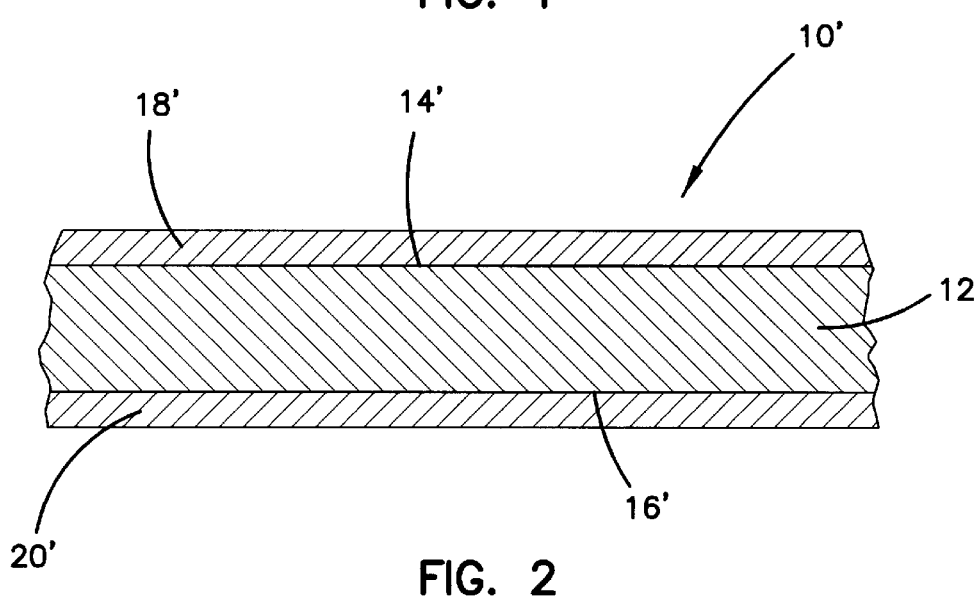
FIG. 2 is a cross-sectional view of an alternative embodiment of a coated paper product according to the principles of the present invention.

Now referring to FIG. 1, a coated paper product according to the present invention is shown at reference numeral 10. The coated paper product 10 includes a paper substrate 12 having a first surface 14 and second surface 16, and a coating layer 18 adhered to the first surface 14. The coating layer 18 is preferably a polylactide polymer composition. An alternative embodiment of the coated paper product of the invention is shown by FIG. 2 at reference numeral 10'. The coated paper product 10' includes paper substrate 12' having first surface 14' and second surface 16', a first coating layer 18' adhered to the first surface 14', and a second coating layer 20' adhered to the second surface 16'. The first coating layer 18' and the second coating layer 20' may be the same or different. Preferably, at least one of the coatings includes a polylactide polymer composition. In the situation where the first and second coatings are both polylactide polymer compositions, it should be understood that both coatings may or may not have the same chemical and/or physical properties. An exemplary product which may require coatings having different properties is a coated paper product for use in the manufacture of cup stock. In such an article, it would be advantageous to provide the coating which will form the exterior of the cup with a high gloss and/or print receptive surface. The coating which would form the interior surface of the cup may desirably have a low coefficient of friction which allows for nesting and denesting of the cup with other cups.

Figure 3:
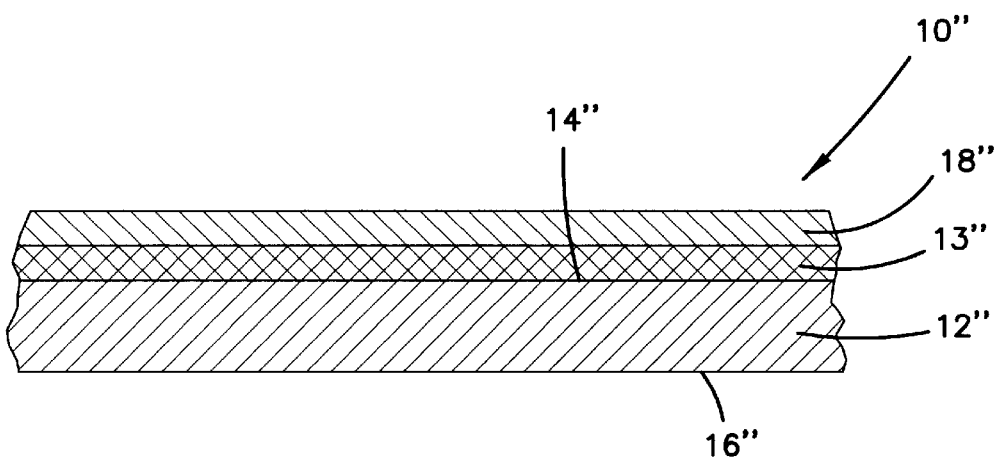
FIG. 3 is a cross-sectional view of an alternative embodiment of a coated paper product according to the principles of the present invention.

A further alternative embodiment of the coated paper product of the invention is shown in FIG. 3 at reference numeral 10". The coated paper product 10" includes paper substrate 12" having first surface 14" and second surface 16". Two layers are then coated on the first surface 14". These layers are first layer 13" and second layer 18". Similar to the situation in FIG. 2, the two layers can be the same or different. In the case where they are both polylactide polymer compositions, it should be understood that they may have different chemical and/or physical properties. For example, it may be advantageous to provide a layer 13" as a sizing coating to enhance adhesion to the first surface 14". The coating 18" can then be applied as a finished surface. For example, the layer 13" can include relatively low molecular weight polylactide for providing enhanced adhesion to the first surface 14". The coating 18" can include a higher molecular weight polylactide composition for providing the desired finished texture. Alternatively, the layer 13" can be used to provide additional barrier properties. It should be appreciated that the layer 13" need not include a lactide polymer. It can be provided from a nonlactide material to provide desired properties such as barrier properties and/or adhesion between layers.

It is expected that the first layer 13" and the second layer 18" will be applied sequentially or at the same time by coextrusion. Techniques for coextruding polylactide are described in detail in U.S. patent pplication Ser. Nos. 08/535,706, filed Sep. 28, 1995, and 08/642,329, filed on May 3, 1996. The entire disclosures of these two patent applications are incorporated herein by reference.

While the invention is described in detail with reference to coated paper products, it should be appreciated that the coated paper product is a type of multilayer structure and that the invention can be characterized more broadly as a multilayer structure or construction. Furthermore, it should be understood that the multilayer structure of the invention need not incorporate paper as a substrate. That is, the multilayer structure of the invention can include a substrate other than paper over which the polylactide polymer composition can be applied. While a preferred embodiment of the invention is described with reference to paper as the substrate, the concepts of the invention can be applied to substrates other than paper as would be appreciated by those skilled in the art.

In most applications where continuous coatings are desired, it is expected that the thickness of the coating will be between about 0.1 mil and about 2 mil. The minimal thickness of the coating is generally limited by the ability to provide a continuous coating without gaps or pinholes. In most applications where processing polylactide polymer, it is expected that a minimal thickness will be about 0.1 mil. The upper limit on the thickness of the coating is generally determined by conservation of material. That is, it is usually not necessary to use more material than needed for a given application. In the case of providing a surface with barrier properties, it is generally desirable to provide a sufficient thickness to maintain those barrier properties. Preferably, the thickness of a polylactide polymer coating will be between about 0.3 mil and about 1.2 mil, and more preferably between about 0.5 mil and 1 mil.

It is generally the purpose of this invention to provide for the processing of polylactide polymer onto paper using readily available paper coating equipment. It is understood that most paper coating equipment is designed for the application of polymers, such as, low density polyethylene onto paper. With very little, if any modification, standard paper coating equipment can be adapted for processing polylactide polymer composition of the invention onto paper. In contrast, linear polylactide tends not to be suitable for processing in conventional extrusion coating equipment without extensive modification.

One aspect of the invention is the modification of linear polylactide to provide to a polylactide composition which can be processed in conventional paper coating equipment. Thus, by adapting the polylactide polymer composition, and/or controlling processing parameters, the polylactide composition can be called "coating grade polylactide" and can be processed through conventional paper coating equipment. Modifications to the equipment or processing conditions which may be helpful include modifying the extruder screw to provide a lower compression to provide higher throughput at a given power level, and by shortening the air gap between the die outlet and the paper to reduce the cooling effect of ambient air. Techniques for modifying conventionally paper coating equipment are described in more detail below.

It is expected that non-modified linear polylactide can be processed on the paper using proximity coating equipment. The proximity coating equipment, however, is less prevalent than conventional extrusion coating processing equipment, and does not provide the throughput levels desired for many commercial paper coating applications. While polymer rheology may not be a problem for non-modified linear polylactide, melt stability may remain a problem in proximity coating processes.

Paper coating equipment can be prepared specially for coating paper with polylactide polymer composition taking into account the various properties of polylactide polymer composition as discussed below. It is expected, however, that specially designing equipment for the processing of polylactide polymer composition will result in a greater capital expense. It is expected that as the market for paper coated with polylactide polymer continues to develop, equipment will be designed for handling polylactide polymer. In the meantime, however, an advantage of the present invention is the ability to use conventional or standard paper coating equipment, typically used with polyethylene, for coating paper with polylactide polymer composition.

Coating paper generally involves particularly severe processing conditions. The reason for this is that the coating composition must be fluid enough to wet the surface of the paper, and adhere to the surface of the paper. Furthermore, commercial processing equipment such as extrusion coating equipment, generally requires high throughput of polymer to coat paper at high speeds. In order to maintain a high throughput of polymer, the polymer must flow through a relatively narrow opening defined by the lips of a die. High temperatures are used to reduce the melt viscosity to provide sufficient throughput.

While high temperatures are required for paper coating processes, the temperature cannot be too high when processing polylactide polymer. The coating composition must maintain a degree of cohesion so that the polymer composition sticks together as a film during application of the polymer composition onto the paper surface. It is generally desirable to provide coated paper having a continuous and smooth coating surface. That is, a coating surface without significant breaks or holes therein. If the melt-processing temperature is too high, the melt elasticity drops dramatically which results in increased neck-in and potential for discontinuous coating.

Furthermore, it is desirable for the film to be as thin as possible while providing a continuous coating over the paper. In order to ensure that the polymer composition is sufficiently fluid, the coating composition must be heated to a temperature in excess of that generally required for other applications such as fiber formation, film formation, and injection-molding.

Paper coating processes generally require very wide dies. The reason for this is that the die is generally wide enough to coat the widest paper the process is designed for coating. In many applications, the dies are as wide as five feet in order to coat three foot wide paper. When it is desired to provide a narrower coating from a given die, the ends of the die can be blocked. This forces the molten polymer composition through the restricted die opening. As a result, the molten polymer may remain in the die for a longer period of time. In particular, eddies or certain circulation patterns may occur at the ends of the die near the blocked regions, which tends to increase the average time the polymer remains in the die which increases the severity of the processing conditions. It is an advantage of this invention that a polylactide polymer composition can be provided which is sufficiently stable to degradation during such processing conditions where ends of the die are blocked.

Extrusion coating and proximity coating are two fairly common methods for coating paper. Both methods can be practiced for applying a polylactide polymer composition to a substrate according to the present invention. In general, extrusion coating is meant include various types of paper coating processes using an extruder to force polymer through a die and includes, for example, curtain coating. Proximity coating generally refers to applications which provide a die nearly in contact with the substrate. The coating resin is typically supplied with a melt pump or with an extruder/melt pump combination. In general, proximity coating is used for the application of pressure sensitive adhesives to a substrate.

Figure 4:
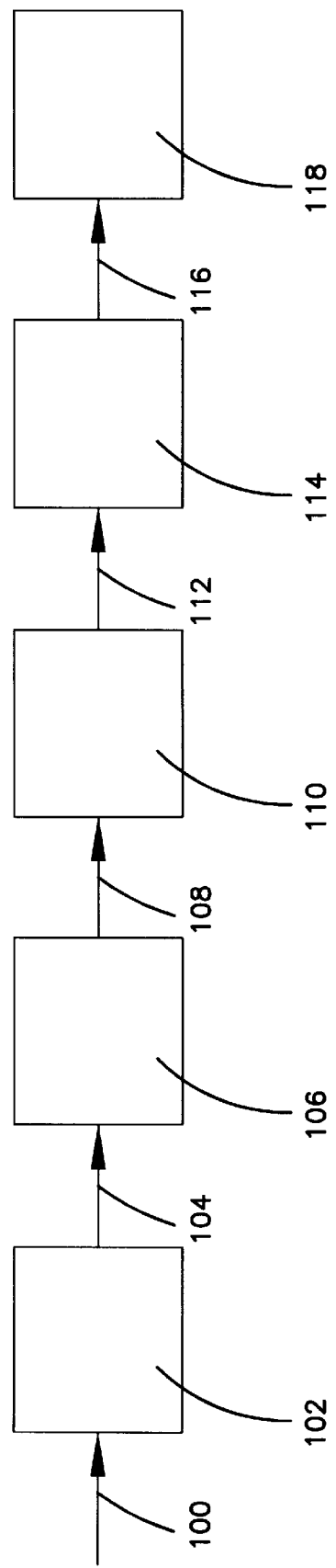
FIG. 4 is a schematic representation of a preferred polymer modification and paper coating process according to the principles of the present invention.

Now with reference to FIG. 4, a diagram showing an overall manufacturing process for producing coated paper according to the present invention is provided. The diagram shows coating grade polylactide polymer at reference numeral 112 which can be fed to the paper coating system 114 for coating paper. The coating grade polylactide polymer 112 possess the desired properties of melt stability and melt elasticity for processing in commercial paper coating equipment. The coating grade polylactide polymer 112 can be in the form of pellets for convenient storage and transport. The paper coating system 114 includes extrusion coating and/or proximity coating processes. The polylactide polymer 112 should have the chemical and physical characteristics identified by the invention for coating paper in conventional paper coating equipment. Coated paper 116 leaving the paper coating system 114 is generally in the form of large sheets or rolls which can then be sent to location 118 for storage or subsequent processing into articles of manufacture. It is expected that the articles of manufacture would include cups, plates, butter/margarine wraps, pet food boxes and sacks, multiwall paper sacks, lawn refuse bags, hamburger and butcher wraps, food containers where grease resistance and/or barrier properties are desired, and food containers where materials recognized as GRAS materials are desired.

It is expected that convertors (paper coating companies) will purchase coating grade polylactide polymer 112 in a form which has been modified to provide the characteristics and properties described in this application. As described in more detail below, it is possible to modify certain types of linear polylactide to provide the characteristics and properties required for coating grade polylactide. For example, one can begin with linear polylactide 100 available from Cargill, Incorporated of Minneapolis, Minnesota under the name EcoPLA™ resin. Alternatively, the commercially available resin may be a viscosity modified EcoPLA™ resin. The linear or viscosity modified polylactide can then be further modified to provide a polylactide polymer having the properties and characteristics required by the coating grade polylactide polymer 112. The linear polylactide can be prepared according to the teachings of U.S. Pat. Nos. 5,338,822 and 5,475,080 which are assigned to Cargill, Incorporated. The viscosity modified polylactide polymer can be prepared according to the teachings of U.S. Pat. Nos. 5,359,026 and 5,594,095 which are assigned to Cargill, Incorporated. The teachings related to the preparation of linear and viscosity modified polylactide provided in these patents are incorporated herein by reference.

The linear polylactide or viscosity modified polylactide 100 is preferably in the form of pellets which are convenient for storage or transport. The reference numeral 102 designates a storage location for the polylactide 100, but it should be appreciated it is not necessary to store the polylactide 100, and that it can be conveyed via line 104 to polymer modification system 106. At polymer modification system 106, the polymer 100 can be modified to provide a polymer having desired melt elasticity as described by the invention. This may include rheology modification such as bridging by reaction with peroxide, branching by reaction with multifunctional chain coupling agents, or by adjusting molecular weight. The polymer modification system 106 can include the use of devolatilization to remove residual lactide, and can include the addition of stabilizer, and a step of drying to remove water. The steps would preferably be accomplished to an extent to provide increased melt stability. The modified polylactide 108 can be conveyed to a dryer 110 for removing water.

The polymer 100 can be either amorphous or semicrystalline polymer. However, once it is processed through the polymer modification system 106 and the dryer 110, it is preferably a semicrystalline polymer. Applicants have found that coating grade polylactide 112 is preferably a semicrystalline polymer. As discussed in more detail below, increased crystallinity is desirable for processing polylactide polymer in a conventional extrusion coating equipment. Alternatively, the coating grade polylactide polymer 112 can be amorphous. In the case of amorphous polylactide polymer, processing aids can be used to enhance processability in conventional extrusion coating equipment. The coating grade polylactide polymer 112 can then be stored or fed directly into a paper coating system 114.

Figure 5:
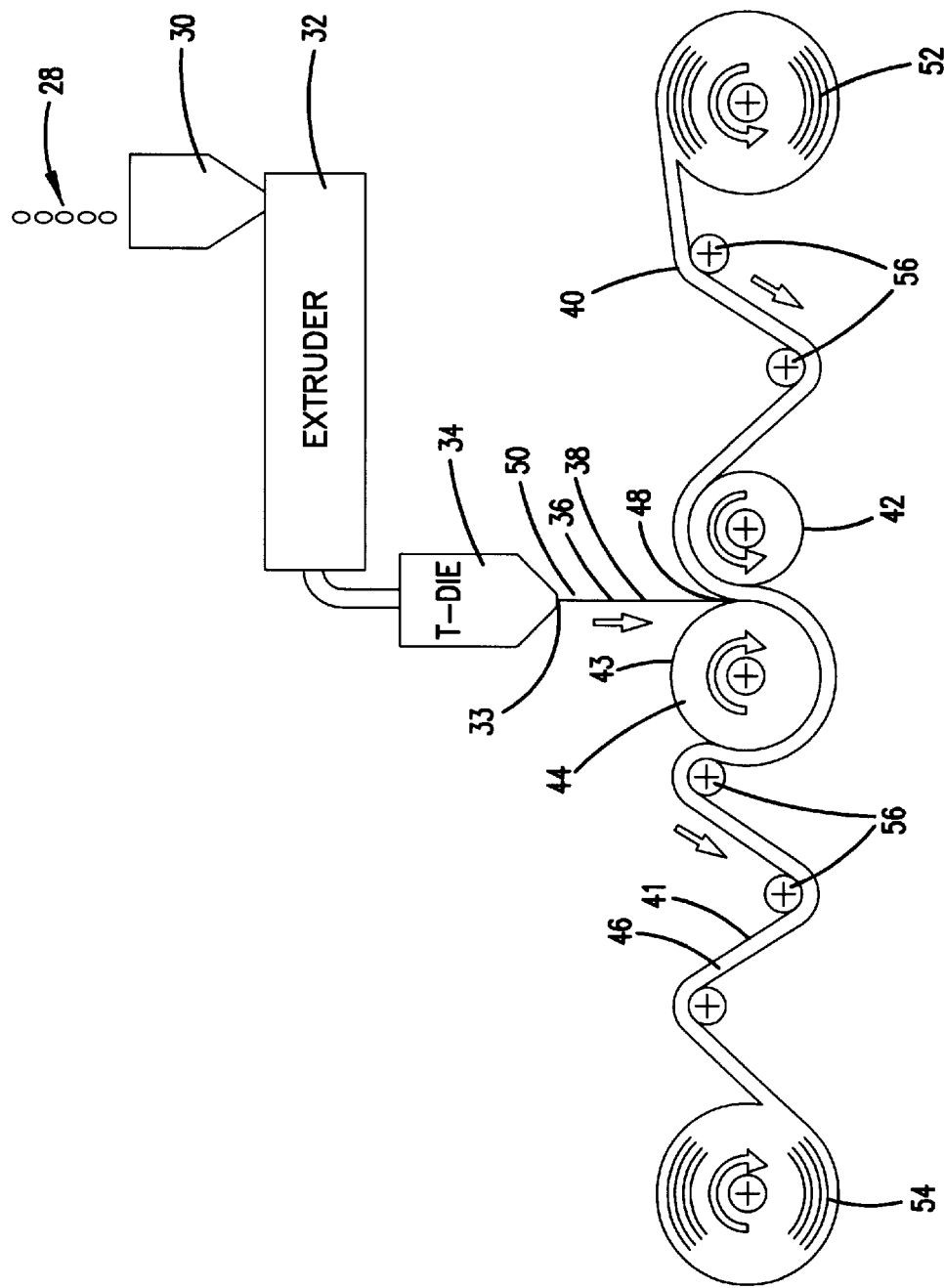
FIG. 5 is a schematic view of an extrusion coating process of the present invention.

With reference to FIG. 5, a diagram showing an extrusion coating process according to the present invention is provided. As shown, polymer pellets 28 can be introduced into the hopper 30 and fed into the extruder 32. The polymer pellets 28 can be referred to as coating grade polylactide polymer having the desired characteristics of melt stability and melt elasticity identified in this application. The polymer pellets 28 correspond to the modified polylactide polymer 112 provided in FIG. 4. It is preferred that the pellets fed to the hopper 30 are semicrystalline to reduce sticking.

It has been found that amorphous polylactide polymer has a glass transition temperature of about 55–60° which results in the pellets sticking together under certain storage conditions or under the increased temperature conditions in hopper 30. Furthermore, it has been found that the amorphous polylactide tends to stick to the screw inside the extruder 32 thereby increasing the energy requirements for operating the extruder 32. Accordingly, it is advantageous for the pellets 28 to be semicrystalline in order to decrease incidence of sticking during storage or in the hopper 30, and to decrease sticking to the extruder screw.

The pellets 28 are melted in the extruder 32 and are forced through an orifice 33 in the die 34 to provide a curtain 36 of melted polymer 38. The melted polymer 38 falls onto a traveling paper substrate 40 and coats the substrate. Generally, the melted polymer 38 can flow at a rate of 5 lb/hr per inch of width to 25 lb/hr per inch of width, or more, in order to coat the paper traveling at a speed of between about 300 ft/min to about 1500 ft/min.

Nip roller 42 and chill roller 44 are provided for enhancing adhesion of the melted polymer 38 to the paper substrate 40. Thus, the pressure generated between the nip roller 42 and the chill roller 44 forces the melted polymer 38 into the fibers of the paper substrate 40 to enhance adhesion. The chill roller 44 contacts the melted polymer 38 and must be temperature controlled in order to prevent excessive heating of the roller which could result in polymer sticking to the roller.

The air gap 50 is the distance between the orifice 33 provided in the of the die 34 and the contact point 48 where the curtain of melted polymer 38 meets the paper substrate 40. When the curtain 36 is in this air gap 50, both sides of the curtain 36 are exposed to ambient air which promotes cooling. Accordingly, it is generally desirable for the air gap 50 to be as small as possible.

It is generally expected that the paper 40 to be coated will be provided on a large roll 52, and once the paper 40 is coated and the coating is cooled to provide a coated paper product 46, it can then be taken up in a large roll 54 or, optionally, can go directly to article manufacture such as paper cup manufacture. Along the process, it is conventional to use tensioning rollers 56 in order to provide smooth flow through the extrusion coating system.

The effect of ambient air temperature on melted polylactide polymer is important. In general, polylactide polymer processing is high temperature constrained. By this, we mean that the temperature of the melted polylactide polymer composition should be high enough to ensure that the entire composition is melted and remains melted when contacting the paper substrate, but should not be so high that depolymerization or degradation is introduced in significant amounts. Thus, it is generally desirable to work as close to the melting temperature as possible. This means, that the air gap should be as small as possible to reduce the extent of polymer degradation while in the die gap. In most conventional polyethylene applications, the air gap is 7–10 inches, to promote oxidation. In the present invention it is important to reduce this air gap to 2–4 inches or less, to prevent excessive cooling of the polymer or the need to compensate for cooling by using high extrusion temperatures.

The chill roller 44 can include a finished surface 43 which can be smooth or textured to provide a finish to the coating 41 on the coated paper 46. It is an important feature of the present invention that the surface of the chill roller can provide different finishes on the polylactide polymer composition coating.

When it is desired to coat both sides of the paper 40, the first coating is applied as described above. A series of rollers can then be used to turn the paper so that the uncoated side is upward facing, then another extruder and die arrangement can be provided for placing a second on the paper 40. Although not shown in FIG. 5, a dryer may be placed before the hopper 30 in order to ensure that the pellets 28 entering the extruder 32 are sufficiently dry.

Figure 6:
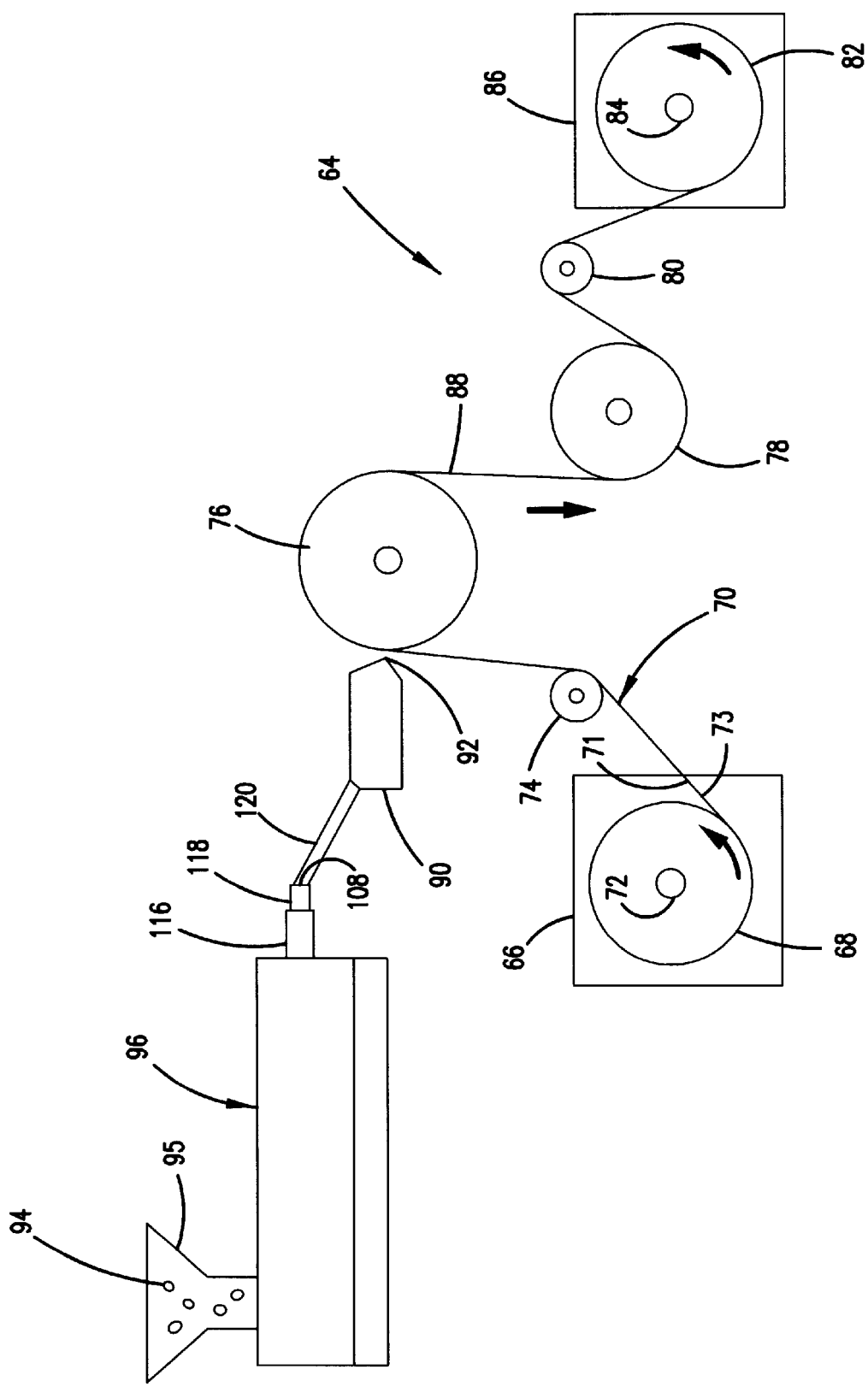
FIG. 6 is a schematic view of a slot coating process of the present invention.

Now referring to FIG. 6, a schematic view showing a conventional proximity or slot coating process is provided. The apparatus 64 includes a first drive mechanism 66 which is capable Alla of supporting a supply roll 68. The supply roll 68 holds a continuous strip of uncoated paper 70. The uncoated paper 70 contains two major surfaces 71 and 73. One or both of these major surfaces 71 and 73 can be coated either sequentially or simultaneously.

The first drive mechanism 66 supports a rotatable spindle 72. The supply roll 68 of uncoated paper 70 is mounted on the spindle 72 which can be driven at a predetermined speed by the first drive mechanism 66 or can be made to rotate by the force exerted on it by removing the uncoated paper 70.

The take-up roll 82 is coaxially mounted on a drive spindle 84 which is rotated by a second drive mechanism 86. The second drive mechanism 86 allows the coated paper 88 to be rewound onto the take-up roll 82 at a predetermined speed and under proper tension.

Guide rolls 74 and 80 serve to align the paper and guide it over coating roll 76 and cooling roll 78, prior to take-up roll 82.

It has been found that a typical line speed using the apparatus 64 is from between about 100 feet per minute (fpm) to about 1200 fpm. A more preferred line speed is from between about 250 fpm to about 600 fpm. This line speed can vary depending upon the type of paper being coated, the particular composition of the liquid resin, the viscosity of the resin, the thickness of the coating, etc.

The apparatus 64 also includes a proximity coater 90 containing a slot die 92. The slot die 92 is angularly aligned with the coating roll 76 such that a narrow opening or nip may be present between the slot die 92 and the coating roll 76. This opening should be wide enough to allow the uncoated paper 70 to pass therethrough. An opening or nip of less than about 0.05 inches (about 1.3 mm), and preferably, less than about 0.01 inches (about 0.25 mm) is sufficient for most applications wherein the thickness of the coating to be applied is less than 1.0 mils. The exact size of the opening can vary depending upon the thickness of the paper which is to be coated, the viscosity of the coating resin, the type of equipment one uses, the speed of the equipment, etc.

Dried, semicrystalline, rheology modified, polylactide resin in pellet form 94 is charged to the hopper 95. From the sealed hopper 95 the pellets are gravity fed into an extruder 96. The extruder 96 melts and heats and conveys the polymer to the pellets.

At the outlet of the throat 116 is a filter 118 which can screen out any lumps or debris that may be present. Upon exiting the outlet 108, the molten polylactide resin passes through a hose 120 into the proximity coater 90. In the coater 90 the temperature of molten resin is maintained and the resin is moved forward through the slot die 92 at a predetermined pressure. The liquid resin is then dispensed in the form of a liquid stream or sheet or film through the slot die 92. The thickness of the liquid resin applied to the uncoated paper 70 can be varied by the size and configuration of the opening formed in the slot die 92, as well as by the internal pressure exerted on the liquid resin by the operation of the coater 90. As the liquid resin is applied to the uncoated paper 70, the paper 70 becomes coated as is indicated by the numeral 88.

A uniform thickness of the liquid resin should be deposited onto the continuous strip of paper 70 as it travels though the opening or nip formed between the slot die 92 and the coating roll 76. The thickness of the coating can be adjusted by varying the speed of the moving paper 70, the size of the opening formed in the slot die 92, the internal pressure exerted on the liquid resin, the viscosity of the resin, the temperature of the resin, etc. One or more of these parameters can be adjusted to precisely control the thickness of the coating which is applied to the coated paper 88.

After the molten resin is deposited onto the passing paper 70, the coating is cooled by passing the paper 88 over the surface of the chill roll 78. The resin is cooled to at least a partially solidified state. Preferably, the resin is cooled to a solid consistency before it is rolled up on the take-up roll 82. One or more sequentially arranged chill rolls can be utilized to more efficiently cool the resin 94. In FIG. 6, only one chill roll 78 is depicted. The chill roll 78 can be cooled by water or by another type of commercially available coolant.

It should be noted that if one desired to coat both major surfaces 71 and 73 of the strip of paper 70 simultaneously, that this is possible. This can be accomplished by installing a second slot coater and a second coating roll adjacent to the first proximity coater 90. Other variations can also be made to the apparatus 64 to suit one's particular requirements. Alternatively, one can run the coated strip of paper 88 back ,through the apparatus 64 and coat the uncoated surface 73 to obtain a strip of paper which is coated on both major surfaces 71 and 73.

B) Characteristics of Process and Coating Grade Polylactide

The Applicants have discovered that certain characteristics should be maintained during the paper coating process in order to provide desirable results. Ways to effect the processing characteristics includes adjusting the chemistry of the polymer composition and adjusting the processing conditions during the paper coating process. Techniques for providing desired processing characteristics are discussed in detail below.

1. Preferred Processing Equipment and Process Conditions

Extrusion coating is a preferred method for coating paper. As discussed previously, it is an advantage of the present invention that conventional polyethylene extrusion coating equipment can be used for coating paper with coating grade polylactide. Conventional polyethylene paper coating equipment is described, for example, in *Film Extrusion Manual*, published in 1992 by TAPPI Press, ISBN:0-89852-250-1, the entire disclosure of which is incorporated herein by reference. One wishing to coat paper with coating grade polylactide may simply adopt the polyethylene extrusion coating equipment identified in the above book and modify it, if necessary, in view of the following comments. It should be appreciated, that many of the modifications are not required. It should be understood that the following conditions identified for processing coating grade polylactide are preferred. The invention is not limited to the conditions identified.

The extruder designed for processing polylactide can have a length/diameter (L/D) ratio of about 24:1. Many extruders used for processing polyethylene have an L/D ratio of about 30:1 or greater. The longer screw in an extruder for processing polyethylene is generally needed to ensure that all of the polymer is melted. Polylactide, in contrast, melts relatively quickly. While a shorter screw length is preferred for processing coating grade polylactide, the longer screws normally associated with processing polyethylene can be used.

The screw design for processing polyethylene generally provides a high compression ratio of about 4:1. Polylactide, in contrast, does not require such a high compression ratio. Applicants have found that polylactide can be processed using a conventional polystyrene extrusion screw. Typical polystyrene extrusion screws are described in, for example, the "Film Extrusion Manual" published by TAPPI, 1992, as referenced earlier.

Extrusion coating systems for processing polyethylene generally provide an air gap of between about 7 and 11 inches. This air gap is relatively long in order to promote oxidation of the polyethylene polymer. Polylactide, in contrast, does not require oxidation in the air gap. Accordingly, it would be advantageous to reduce the air gap to about 4 inches or less. It is particularly preferred to provide an air gap of between about 2 and 3 inches when processing coating grade polylactide. It should be understood that while a small air gap is preferred for processing polylactide, the lowest length of the air gap is determined by the diameter of the chill roll and/or the nip roll and design of the coating equipment. It is generally preferred for the die gap to be as small as possible in order to minimize the effect of cooling by ambient air prior to adhesion to the paper surface.

The space between the die lips is referred to as the die gap. For processing coating grade polylactide, it is preferred that the die gap be between about 15 mils and about 30 mils. Preferably, the die gap is between about 18 mils and about 25 mils. It is generally understood that a larger die gap requires a higher draw down ratio which, in turn, leads to coating instability and weave. If the die gap is too small, the die pressure increases, and the coating may be too thin or provide poor adhesion.

Generally, the chill roll should be run as hot as possible without sticking to the polymer. This preserves energy and prevents condensation on the chill roller. For processing coating grade polylactide, it is generally desired for the cooling water entering the chill roll to have a temperature of about 80° F. While it is difficult to measure the temperature of the surface of the chill roll, it is expected that the temperature should be below the glass transition temperature of the coating grade polylactide. Generally, it is believed that the temperature of the surface of the chill roll will be less than about 130° F.

When processing coating grade polylactide in an extrusion coating process, it is generally desired for the nip pressure to be between about 2 and 5 bar. This amount of pressure helps provide adequate adhesion of the extruded polylactide while avoiding excessive wear on the rollers.

The surface of the chill roll can be modified to provide a desired texture on the coating. For example, a high polished chrome roll can provide a high-gloss finish. The high-gloss finish may be advantageous when it is desired to provide a finished surface for receiving print. A chill roll having a rougher surface can produce a matte finish which may be desirable to provide a coating surface having a lower coefficient of friction.

In most applications for processing coating grade polylactide through a die, it is expected that the die width can be any width commercially used in paper coating processes. Generally, this will correspond to a width of between about 2 feet and about 10 feet. Thus, it should be appreciated that because of the large die width used in extrusion coating processes, the coating grade polylactide must have sufficient melt stability and melt elasticity to flow properly through such a die.

Conventional paper coating equipment for processing polyethylene often have some or all of the following equipment: a non-vented barrel; general purpose screw with L/D ratios of 24:1 to 30:1 and 3:1 compression ratio; screw cooling for feed section; and breaker plate with 60–80 mesh screens for maximum productivity and safety. It should be appreciated that the coating grade polylactide can be processed on such conventional equipment.

2. Preferred Operating Conditions

When processing coating grade polylactide through extrusion coating equipment, it is generally preferred to provide the coating grade polylactide in semicrystalline form prior to melting. Generally, it is preferred that the crystallinity be greater than about 10 J/g, and more preferably greater than about 15 J/g. Applicants have found that amorphous polylactide tends to block during storage and transport. That means amorphous polylactide polymer pellets tend to stick together or agglomerate, particularly under warm conditions often encountered in warehouses in the Southern United States. In addition, amorphous polylactide polymer pellets tend to fuse in the hopper as a result of the heat generated in the extruder. Furthermore, applicants have found that amorphous polylactide polymer tends to stick to the screw in a single-screw extruder. As discussed above, it is expected that the extruders used for processing polylactide will be conventional polyethylene extruders having relatively large L/D ratios. It has been found that amorphous polylactide tends to stick to the screw in such extruders before it is completely melted. These problems can be minimized by providing semicrystalline polylactide.

Prior to the step of feeding coating grade polylactide to the hopper for extrusion coating, it is generally preferred to further dry the polylactide using a conventional in-line drying apparatus. The polymer is preferably conveyed from the in-line dryer to the hopper without exposure to the ambient atmosphere. The coating grade polylactide is generally sensitive to moisture during melt processing, and increased levels of moisture have been found to contribute to molecular weight degradation. Semicrystalline polylactide pellets can be advantageously dried at temperatures of about 60–130° C., whereas amorphous polylactide pellets must generally be dried below about 60° C., which is the glass transition temperature.

The extruder which melts the coating grade polylactide preferably provides a melting temperature of between about 480° F. and about 560° F. It is generally desirable for the temperature of the melted polylactide to be sufficiently high so that all of the polylactide is melted and so that the molten curtain adheres to the paper surface. The upper temperature of the molten polylactide is constrained by considerations of melt strength and degradation. Because polylactide is temperature sensitive, the temperature of the melted polylactide should not be so high as to adversely effect melt strength of the curtain or degradation of the polymer. More preferably, the temperature of the melted polylactide should be between about 495° F. and about 540° F. Most preferably, the temperature of the melted polylactide in the extruder should be between about 500° F. and about 530° F.

The melted polymer is preferably supplied to the die at a throughput of greater than about 5 lbs/hr per inch of die width. More preferably, the throughput is greater than 10 lbs/hr/inch of die width. It has been found that lower throughputs can be utilized to provide thick coatings, but when used to provide thin coatings, sometimes fail to provide adequate adhesion of the coating to the paper substrate. It is believed that low throughputs result in enhanced cooling of the melted curtain so that thin films are not hot enough to provide adequate adhesion. In general, the throughput is determined to provide sufficient heat capacity to obtain desired adhesion to the paper.

Generally, the process linespeed for processing coating grade polylactide in extrusion coating equipment runs at between about 300 and about 2000 ft/min. More preferably, the linespeed is between about 500 and about 1500 ft/min. It has been found that on conventional extrusion coating equipment for polyethylene, polylactide coating thicknesses of between about 0.1 mil and about 2 mil can be provided at these process linespeeds. More preferably, thicknesses of between about 0.3 mil and about 1.5 mil can be provided, and more preferably be between about 0.5 mil and about 1.0 mil.

Melt Stability

The polylactide polymers which can be used in the paper coating operations of the present invention are melt stable. By "melt stable" it is meant generally that the polylactide polymer, when subjected to melt-processing techniques adequately maintains its physical properties and does not generate by-products in sufficient quantity to foul or coat processing equipment. The melt stable polylactide polymer exhibits reduced degradation and/or reduced lactide formation relative to known lactide polymers. It is to be understood that degradation will occur during melt-processing. The compositional requirements and use of stabilizing agents as disclosed herein reduces the degree of such degradation to a point where physical properties are not significantly effected by melt-processing and fouling by impurities or degradation by-products such as lactide does not occur. Furthermore, the melt-stable polymer should be melt-processable in melt-processing equipment such as that available commercially. Furthermore, the polymer will preferably retain adequate molecular weight and viscosity. The polymer should preferably have sufficiently low viscosity at the temperature of melt-processing so that the coating equipment may create an acceptable coating. The temperature at which this viscosity is sufficiently low will preferably also be below a temperature at which substantial degradation occurs.

The stability of polylactide polymers can generally be broken down into three types. Lactide formation stability refers to the resistance to depolymerization to form lactide. High processing temperatures and long processing times tend to result in the formation of lactide in molten polymer. This is a problem because the lactide may flash out during polymer processing, causing fumes and fouling equipment. The presence of large amounts of lactide in the final product is undesirable because of its effect on physical properties in storage life. Molecular weight degradation is a problem because of its effect on viscosity and physical properties, such as, tensile strength, yield, impact resistance, etc. It is important to control molecular weight accurately in order to maintain quality. Polylactide polymers are prone to developing a yellow/brown color upon prolonged exposure to heat. This is undesirable for many applications where a clear color is desirable.

Melt Elasticity

In order to process polylactide polymer on commercial extrusion coating equipment, the polylactide polymer must have good melt elasticity. It is desirable to extrude and draw down thin coatings of polylactide polymer with minimal neck-in at high velocities at the high temperatures required for good adhesion to paper. It is believed that melt elasticity is related to molecular interaction or chain entanglement of the polymer.

As discussed above, coating grade polylactide includes characteristics which allow it to be processed on conventional paper coating equipment typically designed for processing polyethylene. Applicants have found that linear polylactide is generally not suitable for processing unconventional paper coating equipment. It is believed that the reason for this is that linear polylactide does not possess the melt elasticity needed to provide commercially acceptable throughput at acceptable levels of neck-in and coating stability. Linear polylactide is generally characterized by being prepared by ring opening of lactide or by direct condensation of lactic acid in the absence of multifunctional initiators or branching or bridging agents. Linear polylactide will generally have a molecular weight characterized by a Flory-Schultz distribution (also known as the "most probable distribution.") This distribution is generally characterized by a polydispersity index (PDI) of less than about 2.2 (ideally about 2.0) and a $M_z/M_n$ ratio of about 3.0. Most conventional linear polylactide polymers will have values somewhere near these PDI and $M_z/M_n$ values. Some deviation due to variations in polymer processing are expected, but it is also expected that the polymer will exhibit general linear polymer characteristics. This equates to a low degree of chain entanglement and a low melt elasticity. Methods of increasing molecular interaction or chain entanglement are described in detail in U.S. Pat. No. 5,594,095 in columns 4–24, this portion of U.S. Pat. No. 5,594,095 being incorporated herein by reference. Generally, these methods involve increasing molecular weight, increasing branching, or increasing bridging.

It has been observed that increasing molecular weight tends to increase molecular entanglement and also increase viscosity. If the viscosity becomes too high, the polymer will no longer be processable nor will it penetrate into the paper surface for adhesion. Raising the temperature to the level necessary for processing linear polylactide is not practical because melt elasticity is sacrificed and the extent of polymer degradation is increased.

To compensate for the seemingly contradictory properties of increasing melt elasticity while maintaining low viscosity, it is preferable to broaden the molecular weight distribution. The breadth of the molecular weight distribution (MWD) can be characterized by the polydisperisty index (PDI, defined as $M_w/M_n$) or by the ratio Mz/Mn. In addition to increasing the MWD, the high viscosities resulting from increased weight average molecular weight (Mw) can be compensated by blending low molecular weight polymer back into the resin. It is believed that this can be done by adding tackifying resins or low molecular weight fractions of polylactide.

Bridging and branching are preferred methods for increasing chain entanglement and thereby broadening the molecular weight distribution. The degree of chain entanglement is proportional to the type of chain branching or bridging. Long chain branching favors chain entanglement over short chain branching.

Figure 7:
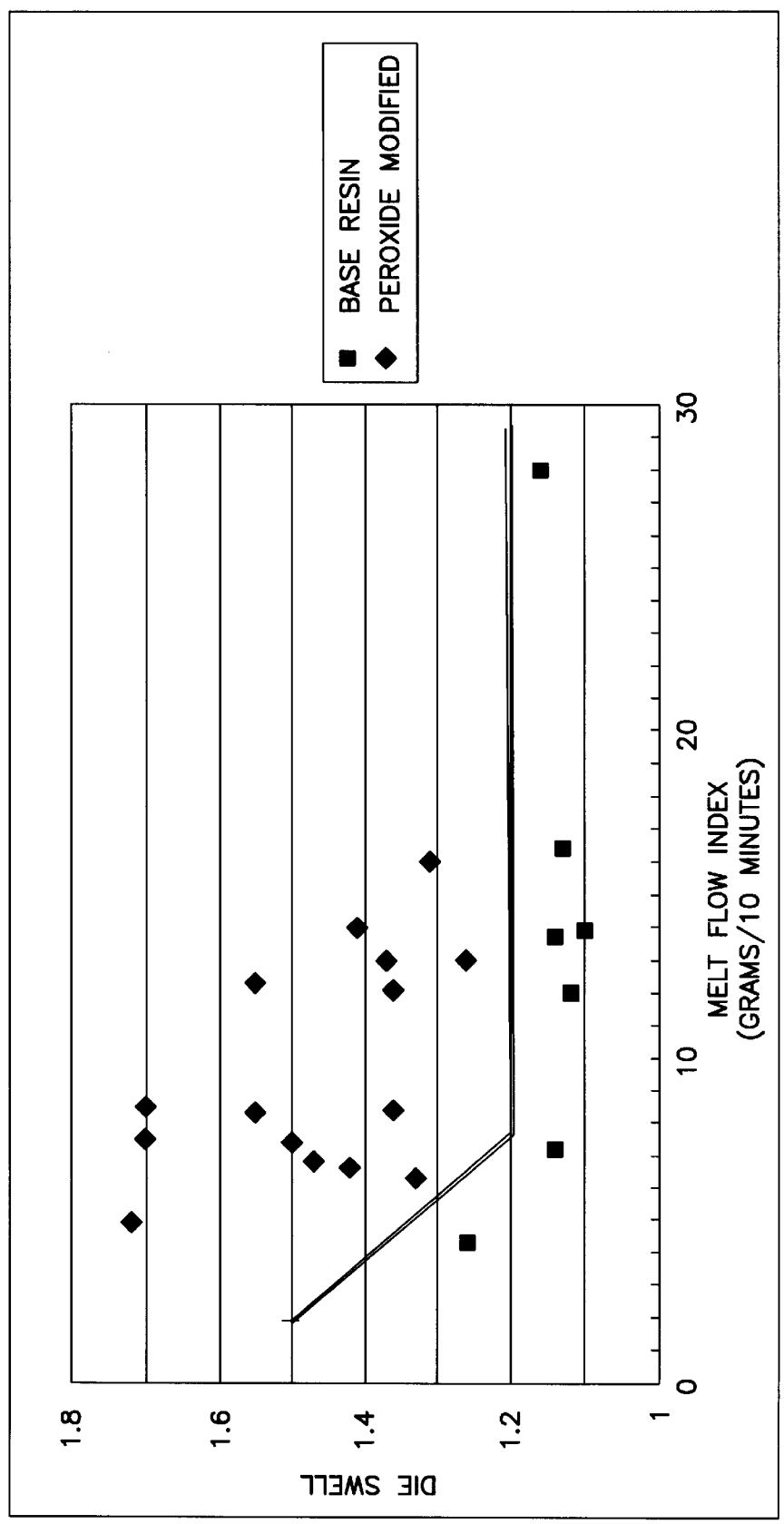
FIG. 7 is a graph showing the relationship between die swell and melt flow index for polylactide polymers.

As discussed above, molecular weight distribution can be used as an indirect indicator of melt elasticity. That is, a broadened molecular weight distribution generally provides desirable melt elasticity. The melt elasticity can be directly assessed by measuring die swell ratio on the extrudate of a melt flow index instrument according to ASTM-D1238 with an 0.0825 inch diameter die and conducted at a 210° C. and 2.16 kg, and reported in grams of polymer per 10 minutes. Die swell is a measure of the ratio of the diameter of the extrudate to that of the die. In the context of this invention, the property of "die swell" is determined by cutting off the polymer strand issuing from the melt flow index test when it is 1 inch long. The diameter of the strand is measured in at least 3 locations and averaged. Generally, this test is repeated about 5 times to improve reproducibility. A Newtonian fluid demonstrates swell ratios of approximately 1.1 or less. As elasticity increases, die swell increases. Accordingly, it is desirable to provide polylactide polymer with a die swell of greater than about 1.25, and preferably greater than about 1.3. Most preferably, the die swell for polylactide according to the invention is greater than about 1.4. By comparison, the die swell of linear polylactide is about 1.2 or less for a melt flow index of 8 or greater, and is about 1.4 or less for melt flow index of 4 or greater, and is estimated to be about 1.5 or less for melt flow index of 2 or greater. This is shown by FIG. 7.

Die swell ratio can be used to access the difference in melt elasticity between polylactide and a commercial grade of low density polyethylene used in extrusion coating. Using a melt flow index instrument at 210° C. and 2.16 kg force, the swell ratio for linear PLA is generally less than or equal to 1.1 whereas the swell ratio for LDPE can be 1.5 or greater. At the same time, the linear PLA tends to provide large neck-in with poor draw down characteristics.

The melted polymer should be provided at a melt viscosity which is sufficient to provide an operating die pressure and allow desired adhesion of the melted polymer to the paper substrate. As discussed above, increasing chain entanglement tends to improve melt elasticity of polylactide, it additionally tends to raise melt viscosity, particularly if it is done by increasing molecular weight. In a preferred process, long chain branching induced by bridging (i.e. by peroxide modification) is used to increase chain entanglement without dramatically increasing melt viscosity. The melt flow index (MFI), as described above, is a useful measure of viscosity. Generally, a high MFI corresponds to a low viscosity material and a low MFI corresponds to a high viscosity material. Linear polylactide exhibits a strong correlation between weight average molecular weight ($M_w$) and MFI, with additional correlation between residual lactide level and MFI. Long chain branching, as preferred in the present composition, causes a deviation from this relationship.

For extrusion coating, applicants have found that the MFI should preferably be within the range of about 2 to about 30. More preferably, the MFI should be in the range of about 8 to about 20, and most preferably in the range of about 12 to about 16.

Now referring to FIG. 7 showing the relationship between die swell and melt flow index (MFI) for epoxidized soybean oil modified polylactide polymer and the same polymer after peroxide modification. The data provided in FIG. 7 is taken from Tables 2–4. It is expected that linear polylactide polymer will exhibit die swell values of less than those exhibited by the epoxidized soybean oil modified polylactide polymer. It should be appreciated that high die swell may be obtainable for linear polylactide polymer but only at very low MFI values (of about 2 or less). For preferred paper coating operations, it is desirable to provide a melt flow index of greater than about 1.2. In preferred compositions, the melt flow index will be greater than about 2, and die swell values greater than about 1.3. Even more preferably, the die swell should be above about 1.4. In general, preferred compositions exhibit MFI and die swell values above the solid line shown in FIG. 7. Preferably, the compositions exhibit an MFI in excess of 10 and a die swell in excess of 1.3 (more preferably 1.4).

The solid line shown in the graph of FIG. 7 can be mathematically characterized as die swell equals 1.6 minus 0.05 times MFI for melt flow index values between 2 and 8; and die swell equal to 1.2 for melt flow index values of 8 or greater. It should be understood that compositions exhibiting a melt flow index of less than 2 are generally not desirable for paper coating applications.

The reason for the difference in the width of the dies and the width of the paper account for a phenomenon known as "neck-in." Neck-in refers to the narrowing of the width of a film as it leaves a die. During certain melt processing operations, linear polymers such as linear polylactide exhibit certain undesired flow properties, such as neck-in. For example, if polylactide is extruded as a film onto a moving substrate, the film of the polylactide being directed onto the substrate will tend to neck under the tensional forces caused by the moving substrate. This neck-in phenomenon leads to problems with controlling the process and problems with maintaining consistency in film thickness. Linear polymers, such as linear polylactide, also tend to exhibit hydrodynamic instability or draw resonance at high draw ratios. This draw resonance can cause a periodic variation in a coating width and/or gauge, for example, that can lead to rupture of the polymer web.

C) Characteristics of Paper Coated with Polylactide

Paper products are often coated with polymeric or wax coatings in order to increase the strength of the paper stock, impart water resistance, enhance gloss, and improve barrier properties. Applicants have found that the use of polylactide polymer composition as a coating for paper stock provides many advantages. In particular, applicants discovered that the use of polylactide polymer composition provides increased grease resistance compared with polyolefins. Grease resistance for paper coated with polylactide polymer composition according to the present invention provides increased grease resistance, with no penetration after 65 hours at 100° C., according to test method ASTM F119. In comparison, polyethylene coated paper shows grease penetration after about 10 hours.

By providing a coated paper product having enhanced grease resistance, it should be readily appreciated that this type of product would be advantageous for use in wrapping products having a high grease content. For example, the coated paper product could be used as a food wrap for wrapping meat and fish products, hamburgers, sandwiches, and cheese. Furthermore, the coated paper would be useful as a liner for pet foods, such as dog food, which tend to be high in fat or grease content.

Polylactide has also been found to provide an effective barrier to flavor and aroma molecules, as exemplified by ethyl butyrate and d-limonene. A method for testing for aroma barrier has been described by J. C. Tou, D. C. Rulf, and P. T. DeLassus, in *Analytical Chemistry*, vol. 62, p. 592–597 (1990). Performance superior to polyolefins was found for polylactide films. This property further enhances its utility in the applications cited above. Polylactide has moderate water vapor transmission rates, which will be suitable for many applications. If high water vapor barrier is needed then additional polymer layers can be provided.

A further advantage of the coated paper product of the invention is the ability to provide a coated paper product which can heat seal at a relatively low temperature. Because of the heat sealing properties, adhesives need not be used when the polylactide polymer composition can serve as the sealing material. In a preferred coating, the polymer composition is amorphous, and can be readily heat sealed at temperatures above the glass transition temperature of 55–600° C.

With reference to FIG. 10, a cup 150 is shown manufactured from a coated paper product 152. The coated paper product 152 includes a paper stock 154 and a polylactide polymer composition coating 156. The cup 150 is manufactured by first providing a large sheet of coated paper. A cup pattern is cut from the large sheet to provide the sheet stock 152. The sheet stock 152 is then rolled and heat sealed along the heat seal edge 158 in order to form the outer wall of the cup. The lip 160 is then formed by rolling down the top edge 162 of the cup and again, this lip 160 is heat sealed. It is an advantage of the polylactide polymer composition that it can be heated at a relatively low temperature, such as a temperature below about 70° C., in order to sufficiently melt the polylactide polymer composition so that it forms a bond. The bottom 164 of the cup 150 is attached by similarly cutting out a pattern, and heat sealing it to the bottom edge 166 of the cup 150.

Applicants discovered that the flexibility of the polylactide polymer composition coating can be maintained by adjusting the molecular weight. For example, by maintaining the weight average molecular weight above 80,000 and preferably above 120,000.

The coefficient of friction of the coated surface of the coated paper product of the invention can be adjusted to a desired level by processing parameters. For example, by adjusting the texture of the chill roll or incorporating slip agents.

Applications where a coating having a low coefficient of friction are desired include applications such as the interior of coated paper cups (for denesting), paper plates (at least one surface), and applicators (such as tampon or suppository applicators).

It should be recognized that a high gloss finish, which may be desirable for many types of applications, will likely result in a high coefficient of friction. An application where a high coefficient of friction may be desirable is in coated paper sacks, where it is desired to be able to stack bags without slipping.

The coefficient of friction (COF) can be determined by following the ASTM method D-1894. Polylactide with a high coefficient of friction will generally have a COF, for polymer sliding on polymer, of greater than 0.6, preferably greater than 0.75. This is readily provided by using a smooth, high gloss roll. A low value of COF, for polylactide coated articles, will be less than 0.6, preferably lower than 0.4, and most preferably in the range of 0.1–0.3. This is comparable to many polyethylene films.

Applicants discovered that polylactide polymer composition, when coated on paper, provides good pinhole performance. In general, preferred polylactide polymer compositions of the invention can be provided with a 0.4 mil thickness and remain essentially pinhole-free. By "essentially pinhole-free," we mean that the coated paper product would provide desired barrier properties when used commercially.

The coating of the present invention exhibits a higher surface energy than typical polyethylene or polypropylene films. These hydrocarbon films have a surface energy in the range of 30–33 dynes/cm. This not only increases the costs associated with production of the films, but the modification treatment will diffuse into the film and will produce an unsatisfactory printing surface.

The surface energy of substantially pure poly(lactide) films of the present invention is about 38 to 44 dynes/cm. This leads to a surface with satisfactory printing characteristics without surface modification. However, in preferred processing, a corona treatment is used to increase the surface energy, to as much as 50 dynes/cm. Additionally, inks which are typically more difficult to apply onto paper coatings, like water based inks, may be applied directly to poly(lactide). Techniques for corona treating as described in *Film Extrusion Manual*, TAPPI Press, 1992, chapter 8, pages 129–150, are incorporated herein by reference.

Products which can utilize the coated paper product include boxes, cups, plates, butter and margarine wraps, pet food sacks or boxes, hamburger wraps, multiwall sacks, lawn refuse bags, and butcher wraps.

II. Materials

In general, preferred polymers which can be provided according to the present invention include as at least one component, polylactide or polylactic acid (polylactide and polylactic acid being referred to, collectively, herein as polylactide or PLA).

In general, polymer nomenclature sometimes references polymers on the basis of the monomer from which the polymer is made, and in other instances characterizes the polymer based upon the smallest repeating unit found in the polymer. For example, the smallest repeating unit in polylactide is lactic acid (actually residues of lactic acid). However, in typical instances, commercial polylactide will be manufactured by polymerization of lactide monomer, rather than lactic acid. Lactide monomer, of course, is a dimer of lactic acid. Herein the terms "polylactic acid," "polylactide," and "PLA" are intended to include within their scope both polylactic acid-based polymers and polylactide based polymers, with the terms used interchangeably. That is, the terms "polylactic acid," "polylactide," and "PLA" are not intended to be limiting with respect to the manner in which the polymer is formed.

The term "polylactide based" polymer or "polylactic acid based" polymer is meant to refer to polymers of polylactic acid or polylactide, as well as copolymers of lactic acid or lactide, wherein the resulting polymer comprises at least 50%, by weight, lactic acid residue repeating units or lactide residue repeating units. In this context, the term "lactic acid residue repeating unit" is meant to refer to the following unit:

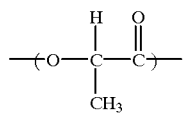

In view of the above definition, it should be clear that polylactide can be referred to both as a lactic acid residue containing polymer and as a lactide residue containing polymer. Herein the term "lactide residue repeating unit" is meant to refer to the following repeating unit:

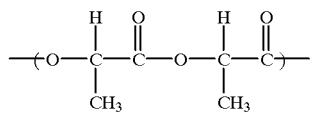

It should be appreciated that the lactide residue repeating unit can be obtained from L-lactide, D-lactide, and meso-lactide. The L-lactide is structured from two S-lactic acid residuals; the D-lactide is structured from two R-lactic acid residuals; and the meso-lactide is structured from both an S-lactic acid residual and an R-lactic acid residual.

Furthermore, it should be understood that the term "PLA" is not intended to limit a composition to one containing only polylactide or polylactic acid as the polymer component. As used herein, the term "PLA" covers compositions which contain a polymer containing the above-described lactic acid residue repeating unit in an amount of at least 50%, by weight, based on the total repeating units in the polymer. A PLA composition can include other components blended in with the polymer containing at least 50%, by weight, lactic acid repeating units. In most applications, it is believed that the component of the coating containing polylactide will be the dominant material. Generally, it is expected that at least about 20% of the component will be comprised of a polylactide material. Preferably, the component will include at least about 70% by weight polylactide, and more preferably at least about 90% by weight polylactide. It should be appreciated that the amount of polylactide present in a particular component depends on the desired property to be imparted to that component. In the case where the component is intended to be completely compostable, it is likely that 100%, by weight, of the component will be polylactide and compostable additives.

A. PLA (Polylactic Acid or Polylactide)

Usable PLA-based polymers for conversion to coating materials according to the preferred techniques described herein, are prepared from polymerization of lactide or lactic acid. In some applications, the polymerization may be a copolymerization, with the lactide or lactic acid monomer copolymerized with another material. In some instances, the lactic acid or lactate may first be polymerized, with the resulting polymer mixture then being reacted, for example copolymerized, with another material in order to provide for some desired modification, for example relating to molecular weight or polydispersity.

In the context of the present invention, reference to degradable polymers includes compostable polymers. Compostable polymers are polymers having at least a portion which will break down and become part of a compost upon being subjected to physical, chemical, thermal, and/or biological degradation in a solid waste composting or biogasification facility. As used in this application, a composting or biogasification facility has a specific environment which induces rapid or accelerated degradation. Generally, conditions which provide rapid or accelerated degradation, compared with storage or use conditions, are referred to herein as composting conditions.

It should be appreciated that the polymers of the invention can be either wholly or partially compostable, depending on the amount of compostable material incorporated into the fibers. The compostable component of the polymer composition should be compostable and biodegradable during a composting/biogasification, or in compost amended soil, at a rate and/or extent comparable to that of known reference materials such as cellulose or paper. Basically, this means that the components should be degradable within a time frame in which products made therefrom, after use, can be recycled by composting and used as compost. It should be understood that certain materials such as hydrocarbons and other polymeric resins including polyethylenes, polypropylenes, polyvinyls, polystyrenes, polyvinyl chloride resins, urea formaldehyde resins, polyethylene terephthalate resins, polybutylene terephthalate resins, and the like are not considered compostable or biodegradable for purposes of this invention because they take too long to degrade when left alone in a composting environment. The rate and extent of biodegradation of compostable materials is described in detail in U.S. patent application Ser. No. 08/642,329, which was filed with the United States Patent and Trademark Office on May 3, 1996, the entire disclosure of which is incorporated herein by reference.

Lactic acid residue containing polymers are particularly preferred for use in the present invention due to their hydrolyzable and biodegradable nature. One theory of the degradation of lactic acid residue containing polymers is that they can be degraded by hydrolysis at hydrolyzable groups to lactic acid molecules which are subject to enzymatic decomposition by a wide variety of microorganisms. It should be appreciated, however, that the precise mechanism of degradation is not a critical feature of the present invention. Rather, it is sufficient that one recognizes that polymers which provide similarly rapid degradation to naturally occurring end products can be useful in the present invention. U.S. Pat. No. 5,142,023 issued to Gruber et al. on Aug. 25, 1992, the disclosure of which is hereby incorporated by reference, discloses, generally, a continuous process for the manufacture of lactide polymers from lactic acid. Related processes for generating purified lactide and creating polymers therefrom are disclosed in U.S. Pat. Nos. 5,247,058; 5,247,059; and 5,274,073 issued to Gruber et al., the disclosures of which are hereby incorporated by reference. It should be appreciated that selected polymers from these patents having the physical properties suitable for use in the present invention can be utilized. Generally, polymers according to U.S. Pat. No. 5,338,822 issued to Gruber et al. on Aug. 16, 1994 and U.S. patent application Ser. No. 08/279,732, filed on Jul. 27, 1994, which are incorporated by reference, can be used in the present invention. Exemplary lactic acid residue containing polymers which can be used are described in U.S. Pat. Nos. 5,142,023; 5,274,059; 5,274,073; 5,258,488; 5,357,035; 5,338,822; and 5,359,026, to Gruber et al., and U.S patent application Ser. Nos. 08/110,424; 08/110,394; and 08/279,732, the disclosures of which are incorporated herein by reference. Polylactide polymers which can be used in the invention are available under the tradename EcoPLA™ from Cargill, Incorporated.

B. Advantageous Properties of Polylactide

In the context of coating formation, it is desirable to provide the polylactide polymer with desired melt flow index, molecular weight ranges, PDI, Mz/Mn, optical composition, and melt stability.

To provide a coating having desired properties of toughness and resistance to cracking, it is preferable that the polylactide polymer is provided with a weight average molecular weight of between about 60,000 and 300,000. More preferably, the weight average molecular weight is provided between about 80,000 and about 275,000, and even more preferably between about 100,000 and about 250,000. It should be understood that the lower limit on the number average molecular weight is determined by physical properties such as tensile strength. The upper limit on number average molecular weight is generally determined by consideration such as melt processability.

Melt flow index (MFI) is a useful indicator of melt processability. In the context of the present invention, values of MFI are measured following ASTM D1238-95 at 210° C. and 2.16 Kg. The preferred compositions of the invention exhibit an MFI between about 2 and about 30, and more preferably between about 8 and about 20, and most preferably between about 12 and about 16. The lower limit on the MFI value is constrained by considerations of viscosity and adhesion to the substrate.

The polydispersity index (PDI) of the polylactide polymer is generally a function of branching or crosslinking. Linear polylactide will generally have a PDI, defined as the weight average molecular weight divided by the number average molecular weight, of about 2.0. Increased bridging or crosslinking may be advantageously used to increase the PDI. Preferred compositions will have a PDI of greater than 2.5 and more preferably above about 2.9.

Linear polylactide is expected to have a ratio of Mz/Mn of about 3. Preferred polylactide of the present invention, in contrast, will have an Mz/Mn ratio of greater than about 6, more preferably greater than about 7, and most preferably greater than about 8. As shown in Example 6 and FIGS. 8 and 9, polylactide polymers exhibiting higher values of Mz/Mn provide improved die swell and reduced neck-in. It should be appreciated that Mz/Mn values as high as 11 are observed in polylactide polymer compositions utilizing the peroxide cross linking methods detailed in Example 6. These compositions are believed to be advantageous and even higher values may be beneficial.

Peroxide cross linking, as described in Examples 6–8 and U.S. Pat. No. 5,594,095 is a preferred method for generating coating grade polylactide. The disclosure of U.S. Pat. No. 5,594,095 at column 15, lines 21–59 is incorporated herein by reference. Other methods for generating coating grade polylactide may also be used, provided adequate die swell is obtained at appropriate MFI.

Peroxide cross linking is believed to be especially effective because the reaction probabilities proportional to the polymer molecular weight. The larger polymer molecules are thereby preferentially cross linked, leading to a rapid increase $M_z$ with only minor changes in $M_n$.

The peroxide is preferably dry blended with the polylactide polymer and compounded in utilizing a twin screw extruder at a temperature appropriate for the peroxide. Typically, temperatures of between about 180° C. and 210° C. are preferred. The molar ratio of peroxide to polymer is typically about 0.01:1 to 10:1 (more preferably 0.05:1 to 3:1). These levels of peroxide will generally provide sufficient polymer action and achieve improvement in rheology. In such circumstances, the number average molecular weight of the polymer increases by only about 10%, whereas the weight average molecular weight increases about 20% or more. Molar ratios of peroxide to polymer of above about 10:1 are believed likely to cause excessive gelling in typical systems. A most preferred molar ratio of peroxide to polymer is between about 0.1:1 to about 0.4:1. This generally corresponds to a weight percent in the range of about 0.05 weight percent to about 0.2 weight percent, based on the weight of the entire composition. It should be appreciated that the above molar ratios of peroxide to polymer roughly correspond to weight percent ranges between about 0.005 weight percent to about 5 weight percent, and preferably between about 0.03 weight percent to about 1.5 weight percent.

Applicants have found that it is beneficial to provide the coating grade polylactide with optical purity. Generally, the optical purity will provide an increased crystallinity. As discussed previously, increased crystallinity (above about 10 J/g provides desirable properties. In particular, semicrystalline pellets tend to avoid sticking or blocking problems normally associated with amorphous polylactide pellets. It is believed that the higher glass transition temperature of the semicrystalline polylactide pellets contributes to this advantage. Furthermore, semicrystalline polylactide can be dried at higher temperatures than amorphous polylactide. However, the optical purity should not be so great as to cause crystallization when applied as a coating. That is, unless it is desired to provide crystallization in the coating. It has generally been found that crystallization in the coating tends to contribute to shrinkage and opacity, and requires higher temperatures for heat sealing. Coating grade polylactide preferably has an optical purity of S-lactic acid residues of between about 90 and about 99.5%, more preferably between about 92 and 98%, and most preferably 95 and about 96.5%. Alternatively stated, the optical purity of the coating grade polylactide provides between 3.5 and about 5% R-lactic residuals. It should be understood that the converse of these values is expected to be true. That is, optically pure coating grade polylactide should be obtainable at high R-lactic acid residuals with low S-lactic acid residuals.

The preferred polylactide polymers for use in paper coating are preferably melt-stable. By this, we mean that the polylactide polymer will be relatively stable to lactide reformation and deplimerization at temperatures encountered during melt processing. With respect to this, the disclosures concerning melt stability provided in U.S. Pat. Nos. 5,338,822 and 5,525,706 are incorporated herein by reference.

Furthermore, it should be understood that preferred melt-stable polylactide compositions preferably include a lactide concentration of less than about 2% by weight, more preferably a lactide concentration of less than about 1% by weight, and even more preferably a lactide concentration of less than 0.5% by weight. Most preferably, to ensure melt stability properties, it is preferred that the lactide concentration is less than about 0.3% by weight. In addition, it is preferred that the extent of lactide generation during melt processing, such as through an extruder, provides generation of less than about 2% by weight lactide. Of course, the more melt-stable the polylactide polymer is as a result of the lower levels of residual lactide, the less it is expected additional lactide will be generated during melt processing. Thus, it is expected that for melt-stable polylactide polymers, melt processing will only generate less than about 1% lactide, and even more preferably less than about 0.5% by weight lactide. While low residual lactide can be important for maintaining melt stability, it should be appreciated that additional additives can additionally be relied upon for providing melt stability. Exemplary additives are described in the two above-referenced patents. It will be appreciated that several of the examples reflect the use of tartaric acid as a stabilizer for polylactide polymers. It is expected that additional carboxylic acids will function to enhance polylactide polymer stability during melt-processing.

It should be understood that the polylactide polymer is moisture sensitive. Accordingly, it is desirable to reduce the water content in the polylactide polymer to a level so that the polymer is melt stable. When feeding coating grade polylactide polymer to processing equipment for coating formation, it is generally desirable to run the polylactide polymer through in-line dryer to reduce the moisture level to less than about 500 ppm, and more preferably less than 200 ppm. The most preferred levels of water, if water is present at all, is less than about 100 ppm and more preferably less than about 50 ppm. In preferred coating operations, the polylactide polymer is not exposed to ambient atmosphere between the in-line drawing step and the polymer melting step.

As discussed above, the conditions of paper coating are very extreme, which promote lactide reformation and molecular weight degradation. The processing temperature often exceeds 260° C. As a result, conditions during paper coating favor degradation of the polymer. Applicants have discovered that it is advantageous to enhance melt stability beyond melt stability requirements often encountered during film formation or molding formation.

C. Copolymers

Lactic acid residue containing polymers include copolymers and are generally prepared from monomers which include lactic acid, lactide, or combination thereof. Polymers which are considered lactic acid residue containing polymers include poly(lactide) polymers, poly(lactic acid) polymers, and copolymers such as random and/or block copolymers of lactide and/or lactic acid. Lactic acid components which can be used to form the lactic acid residue containing polymers include L-lactic acid and D-lactic acid. Lactide components which can be used to form the lactic acid residue containing polymers include L-lactide, D-lactide, and meso-lactide. A particularly preferred copolymer includes residues of both L-lactide residue and D-lactide residue as comonomers.

Viscosity modified polylactide is preferred for providing beneficial die swell. Such polymers are described in detail in U.S. Pat. No. 5,359,026 and U.S. patent application Ser. No. 08/729,732, filed by Gruber et al. on Jul. 27, 1994, entitled "Viscosity-Modified Lactide Polymer Composition And Process For Manufacture Thereof," the application being incorporated in its entirety by reference herein. Viscosity modified polylactide polymers are important because they provide desirable processing characteristics such as reduced viscosity, increased melt strength.

Particularly preferred viscosity modified polylactide polymers include copolymers of lactide and epoxidized multi-functional oil such as epoxidized linseed oil and epoxidized soybean oil. In many situations, it is preferred that the polymer is prepared from 0.1 to 0.5 weight percent epoxidized multifunctional oil and molten lactide monomer. Catalyst can be added, and the mixture can be polymerized between about 160° C. and 200° C.

It should be understood that while many different types of components or reactants can be introduced into the polylactide polymer, the presence thereof does not necessarily make them repeating units. Clearly, the presence of a component or residue thereof at a concentration which corresponds to the presence of a few components or residues in a polymer chain is not repeating.

Other preferred copolymers include copolymers of PLA with other biodegradable polymers, especially aliphatic polyesters. One preferred method to form the copolymers would be through interesterification or coupling in a post polymerization process, such as reactive extrusion. Extrusion in the presence of peroxides may be one way to provide the coupling at the same time as creating non-linear polymer molecules. Alternatively, copolymers of lactide and other cyclic esters, cyclic-ethers, and cyclic ester-amides are possible. Comonomers in this case would include a lactide with glycolide, paradioxanone, morpholinedinones, dioxepane-2-one, dioxanones (such as p-dioxanone), lactones (such as epsilon-caprolactone or 4-valerolactone), dioxan (dione)s (such as glycolide or tetramethyl-1, 4-dioxane-2, 5-dione), or ester-amides (such as morpholine-2–5-dione). With respect to copolymers, reference can be made to the discussion in U.S. Pat. No. 5,359,026, the disclosure of which is incorporated herein in its entirety. Also, copolymers of lactic acid and other hydroxy acids or hydroxy and/or acid terminated low molecular weight polyesters are possible. Aliphatic polyesters or polyester-amides are preferred.

D. Other Components

The polylactide polymer composition can include additional components or additives including, plasticizers, rheology modifiers, crystallinity modifiers, antioxidants, adhesion improvement additives, stabilizers, pigments, nucleating agents, and the like.

Plasticizer

For most lactic acid residue containing polymers, it is believed that the glass transition temperature can be lowered to desirable levels by adding a plasticizer component to provide a concentration of about 0.5 to 20 percent by weight plasticizer, based on the weight of the polymer composition. Generally, a sufficient amount of plasticizer should be incorporated to provide a desired reduction in $T_g$. It is believed that the plasticizer level should be above at least 1 percent by weight, and more preferably above at least 2 percent by weight, to provide sufficient flexibility and softness. Accordingly, the plasticizer if used at all, should be included to provide a concentration level of about 1 to 10 percent by weight.

The selection of the plasticizer can involve consideration of several criteria. In particular, because of the large surface area of polymer exposed during film formation, it is desired to provide a plasticizer which does not volatilize to a significant extent. In addition to the reduction in fumes, this would result in a reduction of plating. It is generally desirable to provide as much biodegradability as possible, it is preferred to use a plasticizer which is biodegradable, non-toxic, compatible with the resin, and relatively nonvolatile.

Plasticizer in the general classes of alkyl or aliphatic esters, ether, and multifunctional-functional esters and/or ethers are preferred. These include alkyl phosphate esters, dialkylether diesters, tricarboxylic esters, epoxidized oils and esters, polyesters, polyglycol diesters, alkyl alkylether diesters, aliphatic diesters, alkylether monoesters, citrate esters, dicarboxylic esters, vegetable oils and their derivatives, and esters of glycerine. Preferred plasticizer are tricarboxylic esters, citrate esters, esters of glycerine and dicarboxylic esters. More preferably, citrate esters are preferred since it is believed that these esters are biodegradable. These plasticizer can be obtained under the names Citroflex A-4®, Citroflex A-2®, Citroflex C-2®, Citroflex C-4® (from Morflex).

Volatility is determined by the vapor pressure of the plasticizer. An appropriate plasticizer should be sufficiently non-volatile such that the plasticizer stays substantially in the composition throughout the process needed to produce the multilayer structure, and to provide desired properties when the structure is used. Excessive volatility can lead to fouling of process equipment, and can result in undesired plasticizer migration. Preferred plasticizer should have a vapor pressure of less than about 10 mm Hg at 170° C., and more preferred plasticizer should have a vapor pressure of less than 10 mm Hg at 200° C. A most preferred plasticizer has a vapor pressure of less than 1 mm Hg at 200° C.

Internal plasticizer, which are bonded to the lactic acid residue containing polymer, may also be useful in the present invention. Exemplary plasticizer which can be bonded to the polymer include epoxides. Plasticizers which are normally solid at room temperature can additionally be used.

Nucleating Agents

In the present invention, a polymer composition is considered to be semicrystalline it if exhibits a net melting endotherm of greater than 10 J/g of polymer when analyzed by differential scanning calorimetry (DSC). To determine whether a polymer composition layer is semi-crystalline, it can be tested in a differential scanning calorimeter, such as by Mettler. The details of performing a test of crystallinity are known to those skilled in the art and are identified in U.S. patent application Ser. No. 08/110,394, filed on Aug. 23, 1993, the complete disclosure being incorporated herein by reference.

If a semicrystalline coating (greater than 10 J/g) is desired, nucleating agents may be incorporated. Nucleating agents may include selected plasticizers, finely divided minerals, organic compounds, salts of organic acids and imides and finely divided crystalline polymers with a melting point above the processing temperature of poly(lactide). Examples of useful nucleating agents include talc, sodium salt of saccharin, calcium silicate, sodium benzoate, calcium titanate, boron nitride, copper phthalocyanine, isotactic polypropylene, low molecular weight poly(lactide) and polybutylene terephthalate. A semicrystalline coating may be desirable in situations where high temperature performance (improved heat resistance) and improved barrier properties are desired. Exemplary applications where a semicrystalline coating may be desired includes hot drink cups, burger wraps, and take-out food containers.

It should be understood that it is generally desirable for the coating to be amorphous. An amorphous polylactide coating generally provides desired clarity. Semicrystalline polylactide coatings tend to turn opaque or white. Amorphous polylactide coatings are generally preferred when it is desired to provide a coating which tends not to shrink. In contrast, if the coating is put down as an amorphous coating which crystallizes as it solidifies, than the coating will tend to cause the paper to warp. Of course, it may be advantageous to provide a coating which causes the paper to warp. In general, it is desirable to provide a coating which does not cause the paper to warp. Such a coating can be obtained if the polylactide polymer composition is applied as an amorphous coating, and solidifies as an amorphous coating.

Amorphous polylactide coatings are generally preferred in situations where heat sealability is an important feature. As discussed above, the property of heat sealability allows the polylactide coating to melt under pressure and provide a heat seal. This is an important characteristic in the formation of cups. Generally, an amorphous polylactide coating will heat seal at a temperature above the glass transition temperature. Accordingly, by heating the polylactide coating above 60° C., it is possible to provide a heat seal. Accordingly, the use of adhesives can be reduced or eliminated.

An amorphous polylactide coating is also preferred when it is desired to provide a coating which degrades faster than, for example, semicrystalline polylactide. Generally, the amorphous structure will compost faster under composting conditions than semicrystalline polylactide.

Amorphous coatings tend to more flexible than semicrystalline polylactide coatings. This is an important consideration, when, for example, it is desired to roll the coated paper back to form a lip on a cup. It is generally not desirably for the coating to crack under such an application. In addition, an amorphous polylactide coating generally provides better adhesion to paper compared with a semicrystalline polylactide coating.

Fillers

Low levels of fillers may be useful to prevent blocking or sticking of the coated paper product during storage and transport. Inorganic fillers include clays and minerals, either surface modified or not. Examples include talc, diatomaceous earth, silica, mica, kaolin, titanium dioxide, and wollastonite. Preferred inorganic fillers are environmentally stable and non-toxic.

Organic fillers include a variety of forest and agricultural products, either with or without modification. Examples include cellulose, wheat, starch, modified starch, chitin, chitosan, keratin, cellulosic materials derived from agricultural products, gluten, nut shell flour, wood flour, corn cob flour, and guar gum. Preferred organic fillers are derived from renewable sources and are biodegradable. Fillers may be used either alone or as mixtures or two or more fillers. Preferred levels of fillers, if used at all, will be less than 10 wt % and more preferably less than about 5 wt %.

Surface Treatments

Surface treatments may also be used to reduce blocking. Such treatments include dusting the surface with materials which reduce the surface contact between the polylactide base coating and the adjacent surface. Examples of materials which may be used in surface treatments include talc, silica, corn starch, cornmeal, latex spheres, or other particulats. Additional surface treatments include chemical or physical treatments. Such treatments include corona and flame treatments which increase the surface energy of the poly(lactide) based coating. Corona and flame treatment processes are conventional and are described in detail in the TAPPI "Film Extrusion Manual", 1992, Chpt. 8, p. 129–150, the disclosure of which is incorporated herein in its entirety. In most applications where polylactide based coatings are corona or flame treated, it is expected that a mild corona treatment will bring the polylactide surface energy to about 45–50 dynes/cm.

Lubricants

For certain applications, it is desirable for the coating to have good slip properties. Lubricating solids such as fluoropolymer powders or graphite are sometimes incorporated into materials to increase slip properties. The fatty acid esters or hydrocarbon waxes commonly used as lubricants for the melt state, are gradually exuded, if used in very high concentrations, thus yielding to permanent lubricating effects. Certain additives migrate so strongly to the surface, even during cooling, that a uniform invisibly thin coating is formed. Thus, these slip agents may be important in the production of coatings which are used in automatic packaging machines. Preferred lubricants have been found to reduce amperage for operating the screw of an extruder about 10 to about 15% when added at about 1000 ppm by weight (compared to amperage without lubricant).

Internal lubricants which can be used in the present invention include fatty acid esters, amides, metal salts and soaps, and paraffin or hydrocarbon waxes. Examples of useful lubricants include Zinc stearate, Calcium stearate, Aluminum stearate, stearic acetiatic, White Beeswax, Candelia Wax, high MFI LDPE, Eastman Epolene N21, Eastman Epolene E20, and Loxiol HOB7119. Preferred internal lubricants include Aluminus stearate and stearic acetate.

Antistatic Agents

Antistatic agents may be employed in the present invention. Antistatic agents are surfactants which can be subdivided into cationic, anionic, and nonionic agents.

With regard to cationic compounds, the active molecule part generally consists of a voluminous cation which often contains a long alkyl residue (e.g. a quaternary ammonium, phosphonium or sulfonium slat) whereby the quaternary group can also occur in a ring system (e.g. imidazoline). In most cases, the anion is the chloride, methosulfate or nitrate originating from the quaternzation process.

In the anionic compounds, the active molecule part in this class of compounds is the anion, mostly an alkyl sulfonate, sulfate or phosphate, a dithiocarbamate or carboxylate. Alkali metals often serve as cations.

Nonionic antistatic agents are uncharged surface-active molecules of a significantly lower polarity than the above mentioned ionic compounds and include polyethylene glycol esters or ethers, fatty acid esters or ethanolamides, mono- or diglycerides or ethyoxlated fatty amines.

Surfacants

For certain applications, it is desirable for the coating to be modified to alter the water transport properties. Surfactants may be incorporated into the web of the present invention to increase the water transport properties.

Surfactants which are useful can be subdivided into cationic, anionic, and nonionic agents.

Pigments

Pigments, dyes, or color agents may also be added as necessary. Examples include titanium dioxide, clays, calcium carbonate, talc, mica, silica, silicates, iron oxides and hydroxides, carbon black and magnesium oxide.

Adhesion Improvement Additives

In certain applications, it may be desirable to provide adhesion improvement additives for enhancing or improving the adhesion of the coating to the substrate. A general class of such additives can be referred to as tackifying additives. It is believed that these additives tend to lower the viscosity of melted polylactide polymer which, in turn, promotes adhesion of the melted polylactide polymer to a substrate, especially paper. Additives which may be useful in this regard include plasticizers, lactic acid oligomers, low molecular weight polylactide and tackifying resins. The preferred additives are relatively polar and have a solubility parameter close to that of polylactide. Preferably, the solubility parameter will be within about 5 $cal^{0.5}/cm^3$. These additives will preferably will be added in an amount of between about 1 and about 10% by weight and more preferably between about 3 and about 8% by weight.

Catalysts

In the manufacture of polylactide compositions of the present invention, the reaction to polymerize lactide is catalyzed. Many catalysts have been cited in literature for use in the ring-opening polymerization of lactones. These include but are not limited to:SnCl$_2$, SnBr$_2$, SnCl$_4$, SnBr$_4$, aluminum alkoxides, tin alkoxides, zinc alkoxides, SnO, PbO, Sn (2-ethyl hexanoates), Sb (2-ethyl hexanoates) (sometimes called octoates) Ca stearates, Mg stearates, Zn stearates, and tetraphenyltin. Applicants have also tested several catalysts for polymerization of lactide at 180° C., which include: tin(II) bis(2-ethyl hexanoate) (commercially available from Atochem, as Fascat 2003, and Air Products as DABCO T-9), dibutylin diacetate (Fascat 4200®, Atochem), butylin tris(2-ethyl hexanoate) (Fascat 9102®, Atochem), hydrated monobutylin oxide (Fascat 9100®, Atochem), antimony triacetate (S-21, Atochem), and antimony tris (ethylene glycoxide) (S-24, Atochem). of these catalysts, tin(II) bis(2-ethyl hexanoate), butylin tris(2-ethyl hexanoate) and dibutylin diacetate appear to be most effective.

Finishing Oils

For some applications, it may be useful to apply surface treatments to provide lubricity, change hydrophilicity, alter static characteristics and affect cohesion. An example of such surface treatments are finishing oils. Finishing oils may affect the above fiber properties, but also affect down stream fiber processes. Such processes include manufacturing of yarns and carding. Examples of some of the finishing oils that could be used for PLA include stearates or other commercially available proprietary oils.

Peroxides

Preferred peroxides are dialkyl peroxides. Exemplary dialkyl peroxides include dicumyl peroxide; α, α'- di(t-butylperoxy) diisopropylbenzene; 2,5-dimethyl-2,5-di(t-butylperoxy) hexane; t-butyl cumyl peroxide; di-t-butyl peroxide; and 2,5-dimethyl-2,5-di (t-butylperoxy) hexyne-3. The 2,5-dimethyl-2,5-di-(t-butylperoxy) hexane, available as Varox DBPH-50 from R. T. Vanderbilt or Luperco 101-XL from Elf Atochem is particularly preferred.

E. Other Polymers

As discussed above, many different types of polymers can be blended with polylactide and used in the present invention. Exemplary types of polymers which can be blended with polylactide include polyolefins, polyamides, aromatic/aliphatic polyesters, including polybutylene terephthalate and polyethylene terephthalate, and combinations thereof. Additional types of polymers which can be used include destructurized starch compositions, polyhydric alcohols and derivatives, hydroxypropyl cellulose derivatives, cellulose esters, biodegradable aliphatic polyesters, ethers, urethanes, and biodegradable aliphatic-aromatic polyesters. Examples of destructurized starch compositions include starch in combination with ethylenevinyl alcohol (EVOH) available as Mater-Bi from Novamont. Exemplary polyhydric alcohols and derivatives include polyvinyl alcohol modified with appropriate plasticizers, such as, glycerol, ethylene glycol, polyvinyl alcohol in combination with poly(alkeneoxy) acrylate which is available as Vinex from Air Products and Chemicals. An exemplary hydroxypropyl cellulose derivative includes hydroxypropyl cellulose non-ionic cellulose ether, such as that available as KLUCEL from Hercules. Exemplary cellulose esters include cellulose acetates (Tenites available from Eastman and including proprionates and butyrates), cellulose acetate proprionates, and cellulose acetate butyrates. Exemplary biodegradable aliphatic polyesters include polyhydroxy butyrate (PHP), polyhydroxy butyrate-co-valerate (PHBV) available as Biopol, polycaprolactane available as Tone from Union Carbide, polybutylene succinate available as Bionelle 1000 series by Showa, polybutylene succinate-co-adipate available as Bionelle 3000 by Showa, polyglycolic acid (PGA), various grades of polylactide (PLA), polybutylene oxalate, polyethylene adipate, polyparadioxanone, polymorpholineviones, and polydioxipane-2-one. Exemplary ethers include polypropylene oxide and copolymers of polypropylene oxide and polyethylene oxide and copolymers of polyethylene oxide. Exemplary polycarbonates include polyethylene carbonate, polybutylene carbonate, and polytrimethylene carbonate and its derivatives. Exemplary urethanes include urethanes made with polyester or ethers or mixtures thereof, or made from polyesters and urethanes to provide aliphatic polyester urethanes. Biodegradable aliphatic-aromatic polyesters include polybutylene succinate-co-terephthalate available from Eastman, and Biomax from Dupont.

Additional components which can be either blended with the PLA or utilized as another component of a multicomponent film include thermoplastic resins, such as, hydrocarbons, polyesters, polyvinyl alcohols, poly (acrylonitrile) polymers, and select highly substituted cellulose esters. Exemplary hydrocarbons include polyethylene, polypropylene. Exemplary polyesters include aromatic polyesters, such as, polyethylene terephthalate (PET) and polybutylene terephthalate (PBT).

Polymers which can be used in the present invention include PLA and PLA-based polymers, other biodegradable or water-soluble polymers, such as PVA, other lactic acid-containing polymers (e.a.,lactic acid-based polyurethanes, polycaprolactone (PCL), polypropiolactone, cellulose acetates, glycolide-containing polymers (PGAs), degradable polyesters (aliphatic), polyhydroxy propionate (or butylate, capreolate, heptanoate, valerate or octanoate), polyester amides, aliphatic diol polymers, aliphatic and aromatic dicarboxylic acids, and, where applicable, copolymers and blends thereof.

An exemplary preferred polymer is a polybutylene succinate homopolymer sold under tradename Bionelle 100™ and is available from Showa Highpolymer Co., Ltd.

B) Paper Generally

According to the present invention, the polylactide polymer composition can be coated onto any substrate to which it will adhere. Exemplary substrates include natural and synthetic paper, polymer films, and aluminum foil. Preferably, the polylactide polymer composition is coated onto paper such as, bleached and unbleached Kraft paper, clay coated paper, bleached and unbleached packaging paper, bleach boxboard, and the like.

Various weights of paper can be utilized. For example, in the manufacture of a cup, it is generally desired to use a paper having a weight of between about 210–250 g./sq. m.

EXAMPLE 1

Paper with a High Gloss, Water Resistant, Biodegradable Coating

A 20 percent solution of poly(lactide) with a molecular weight of 40,000 in a solvent of chloroform was cast onto 50 lb Kraft paper (Georgia Pacific) using a 15 mil draw bar. After allowing the coating to dry at room temperature for 24 hours, the coated paper was placed into a vacuum oven at 40° C. and high vacuum for 24 hours to remove the residual solvent. Coating thickness after drying was 2 mils. The resultant coating had excellent clarity and high gloss; a 60° gloss value of 83 was found according to ASTM D 523-85. Exposing the coating to water for 8 hours did not affect its appearance. The flexibility of the coating was verified by bending the coating over a ⅛" mandrel.

EXAMPLE 2

Heat Sealability of a Biodegradable Paper Coating

A 20 percent poly(lactide) chloroform solution was cast onto 50 lb Kraft paper (Georgia Pacific) using a 15 mil and a 25 mil draw bar. The coated paper was allowed to dry at room temperature for 24 hours. Residual solvent was removed in a vacuum oven at 30° C. under high vacuum. The dried coating thicknesses were 2 mil and 4 mil respectively.

The coated paper was tested for its heat scalability to uncoated paper using 1" wide test specimen. A Sencorp Heat Sealer Model 12-As/1 was used to apply a preset pressure for a given time and temperature with two 1×12" jaws. The 1" wide coated paper was mated to an uncoated paper of the same dimensions. The pressure was varied from 60 to 80 psi, the temperature from 200° to 280° F., and the time from 0.5 to 1.5 seconds. The samples were allowed to cool to room temperature. The quality of the resultant bond was thereafter assessed using a hand T-peel test and visually judging the degree of fiber tear from the substrates.

Samples were judged an "excellent" heat seal (2) if they had 100 percent fiber tear of the uncoated strip onto the coating. A "better" heat seal (1) was partial fiber tear of the uncoated strip. "Poor" heat seal (0) indicates no fiber tear. The tests were run using both a 2 mil and 4 mil coating. An * indicates an average of multiple tests. The following are the results:

TABLE 1

0 = POOR 1 = BETTER 2 = EXCELLENT
* = AVERAGE OF MULTIPLE TESTS

| Time (Sec) | | | | | | | | | |
|---|---|---|---|---|---|---|---|---|---|
| 1.5 | 0 | 0 | 1 | | 2 | 2 | | | |
| 1.0 | 0 | | | 1 | 1 | 1* | 2* | 2* | |
| 0.5 | 0 | | 0 | 0 | 0 | 0 | 0* | 0* | 1.5* |
| | 220 | 210 | 220 | 230 | 240 | 250 | 260 | 270 | 280 |
| | | | | TEMPERATURE ° (F) | | | | | |

Due to the thermoplastic nature of the coating, the bonded substrates may be debonded upon application of heat and stress at the bondline as the coating softens. This offers an additional option for recycling of coated paper.

EXAMPLE 3

Repulpability of the Biodegradable Coating at pH 7

A 20 percent solution of poly(lactide) in chloroform was cast onto 70 lb Kraft paper (Georgia Pacific) and dried overnight at room temperature. The residual solvent was removed in a vacuum oven at 30° C. under high vacuum. The dry coating thickness was 5 mil.

Several one square inch pieces of the coated paper were placed in one liter of pH 7, 140° F. water in a Waring blender. The solids content was 2 percent w/v. The coated paper was mixed at a low shear setting for 8 minutes. The coating was removed from the pulp by filtering through a No. 5 sieve. Although a small amount of the fiber remained adhered to the coating, the compostability of such mixture would be excellent. Also, recoverability of the lactic acid form the hydrolysis of the coating would not be hindered by the presence of trace levels of wood fiber.

EXAMPLE 4

Repulpability of the Biodegradable Coating Under Alkaline Conditions

One square inch pieces of the coated paper prepared in Example 3 were placed into 1 liter of pH 10 water at 140° F. in a Waring blender. The solids content was 2 percent w/v. After agitating for 8 minutes at a low shear setting, the fibers were recovered by filtering through a No 5 sieve. Although a small amount of fiber remained adhered to the coating, the compostability of such a mixture would be excellent. Also, recoverability of the lactic acid from the hydrolysis of the coating would not be hindered by the presence of the trace levels of wood fiber.

EXAMPLE 5

Coating Examples

Two samples of melt stable poly(lactide) were used in a continuous paper coating trial. The poly(lactide) was dried and devolatilized, with an initial lactide concentration of 0.5 weight percent. The poly(lactide) was produced from lactide using catalyst at a level of 5000:1 molar ratio of monomer to catalyst. The catalyst was tin(II)bis(2-ethyl hexanoate). Stabilizer (Weston PNPG) was added at the start of polymerization at a rate of 0.2 weight percent. The first poly (lactide) sample had an initial weight average molecular weight of 75,000 and the second had an initial weight average molecular weight of 105,000.

The poly(lactide) was melted in a reservoir and then pumped through a die to produce an 8" coating width, using a May Coating Technologies CLS-300 coater and model 50B bulk melter. The die is held in place by pneumatic pressure and floats against the substrate with a melt cushion in between. The substrate was natural Kraft paper, basis weight 50 lb, 12" wide.

75,000 molecular weight test: The polymer was melted and pumped at temperatures of 190°–200° C. The pump speed was set to 2.6 lb/min and the line speed was set to 375 feet per minute and 75 feet per minute to give coating thicknesses of approximately 1 mil and 5 mil, respectively. For the 5 mil coating, the temperature at the rewind was 80° C. so a release coated film (MYLAR®) was wound in to eliminate blocking. Subsequent runs incorporated a chill roll and did not use a release film.

105,000 molecular weight test: The polymer was melted and pumped at temperatures of 215°–227° C. At a reservoir temperature of 227° C. the polymer was giving off noticeable fumes. The pump speed was set to 2.6 lb/min and the line speed was set to 375 feet per minute to give a coating thickness of approximately 1 mil. Additional tests were made at line speeds of 150 feet per minute to 500 feet per minute, giving coating thicknesses of 2.5 mil to 0.75 mil, respectively.

The coatings had high gloss and had excellent adhesion to the paper. The coatings exhibited good water repellence, high tear resistance, and increased stiffness.

PLA coated paper (2.5 mils) was tested for blocking at three temperatures 25°, 53°, and 63° C. under a load of 17.5 ounces applied to an area of 262.5 square centimeters, using a substrate placement of film to film, paper to film, film to film (talc dusting). After 24 hours the paper to film and film to film (talc dusting) showed no blocking at 25°, 53° or 63° C. whereas the film to film substrate placement showed no blocking at 25° C. and blocking at 53° C.

EXAMPLE 6

Effect of Peroxide Modification on Properties

In this example, four resins were treated with two levels of peroxide to determine the effect of peroxide cross linking on polymer properties such as Mn, Mz, Mz+1, Melt Flow Index (MFI), die swell, and neck-in during cast film extrusion. The four resin samples, labeled A-D, were all prepared in a semi-works scale plant using a 4,000–6,000 pound batch and included 0.35 wt % epoxidized soybean oil (available as PARAPLEX G-62, from C. P. Hall Company) as a copolymerizing agent, tin II (bis 2-ethyl hexanoate) as a catalyst in a molar ratio of 1 part catalyst to 80,000 parts lactide (catalyst available as DABCO T-9, from Air Products Company), and a process stabilizer (typically TNPP from G. E. Speciality Chemicals). The polymerization temperature was about 180–200° C. for a time of about 9–13 hours. The samples were devolatized using a twin screw extruder and a wiped film evaporator, leaving a residual lactide content of less than 1 wt %. The polymer was then pelletized and dried.

The test samples were prepared by dry blending a peroxide (Varox DBPH-50 from R. T. Vanderbilt Co., which is 45 wt % 2,5-dimethyl-2,5-di(t-butylperoxy)hexane on a 1:1 blend of calcium carbonate:silica inert filler) at 0.05 wt % or 0.10 wt % with the dried polymer pellets and reacting them by extruding at 10 lb/hr in a Leistritz 34 mm corotating twin screw extruder. The extruder was run at 100 rpm screw speed and a temperature of 180° C. with a residence time of about three minutes. The extruder has 11 zones, numbered starting at the feed section, with temperatures of 160° C. in zone 1, 175° C. in zone 2, 180° C. in zones 3–9, and 185° C. in zones 10–11. Samples were also prepared using an extruder temperature of 210° C. and similar results were obtained, although there was more scatter in the data and evidence of thermal degradation (decrease in number average molecular weight). Extrusion was conducted under vacuum to remove volatile decomposition products. The resin was then pelletized, dried, and annealed at 110° C. for 12 hours to crystallize the pellets. Crystalline pellets have been found to cause less problem with screw sticking, when processing poly(lactide) in single screw extruders. The control samples, with no peroxide addition, were processed in the same way as the peroxide treated samples in order to give them the same thermal history.

The samples were then tested for a number of properties. Gel Permeation Chromatography (GPC) was used to determine the various molecular weight averages, including Mn, Mw, Mz, Mz+1. This procedure has been described previously. Die Swell and Melt Flow Index were determined on a Tinius Olsen Melt Indexer, model MP993, using a 0.0825 inch diameter die at 210° C. under a 2.16 kg load. This procedure has been described previously.

The performance of the samples on a small cast film line was used to determine the propensity for neck-in, as follows. A one inch Killion single screw extruder operated at a temperature of 170° C. with a screw speed of 40 rpm was used with a six inch cast film die, also at 170° C., to extrusion cast a film onto a eight inch diameter takeup roll running at 12 rpm. The neck-in is reported as the width of the die (six inch) minus the width of the cast film, in inches.

Figure 8:
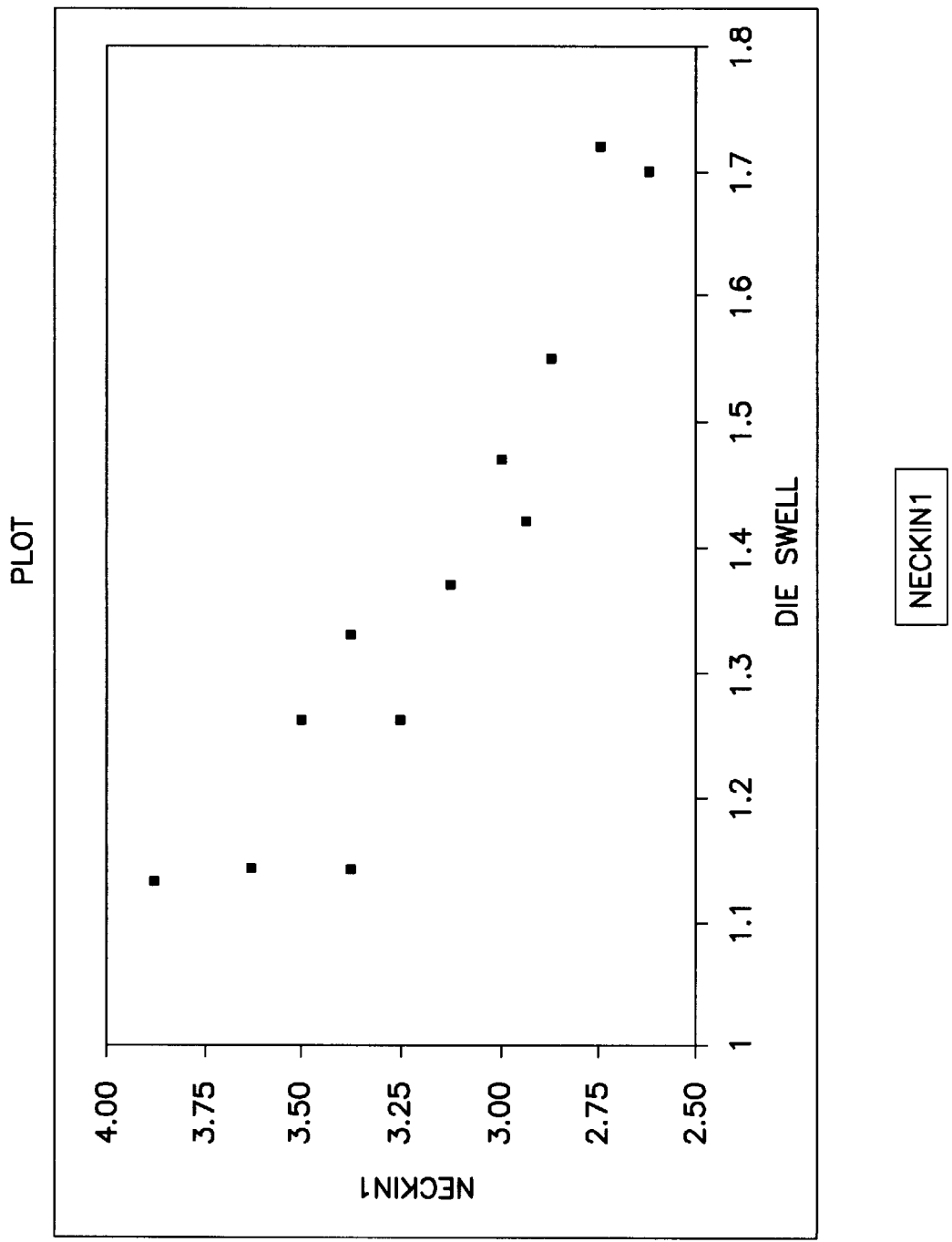
FIG. 8 is a graph showing the relationship between neck-in and die swell for polylactide polymers.
Figure 9:
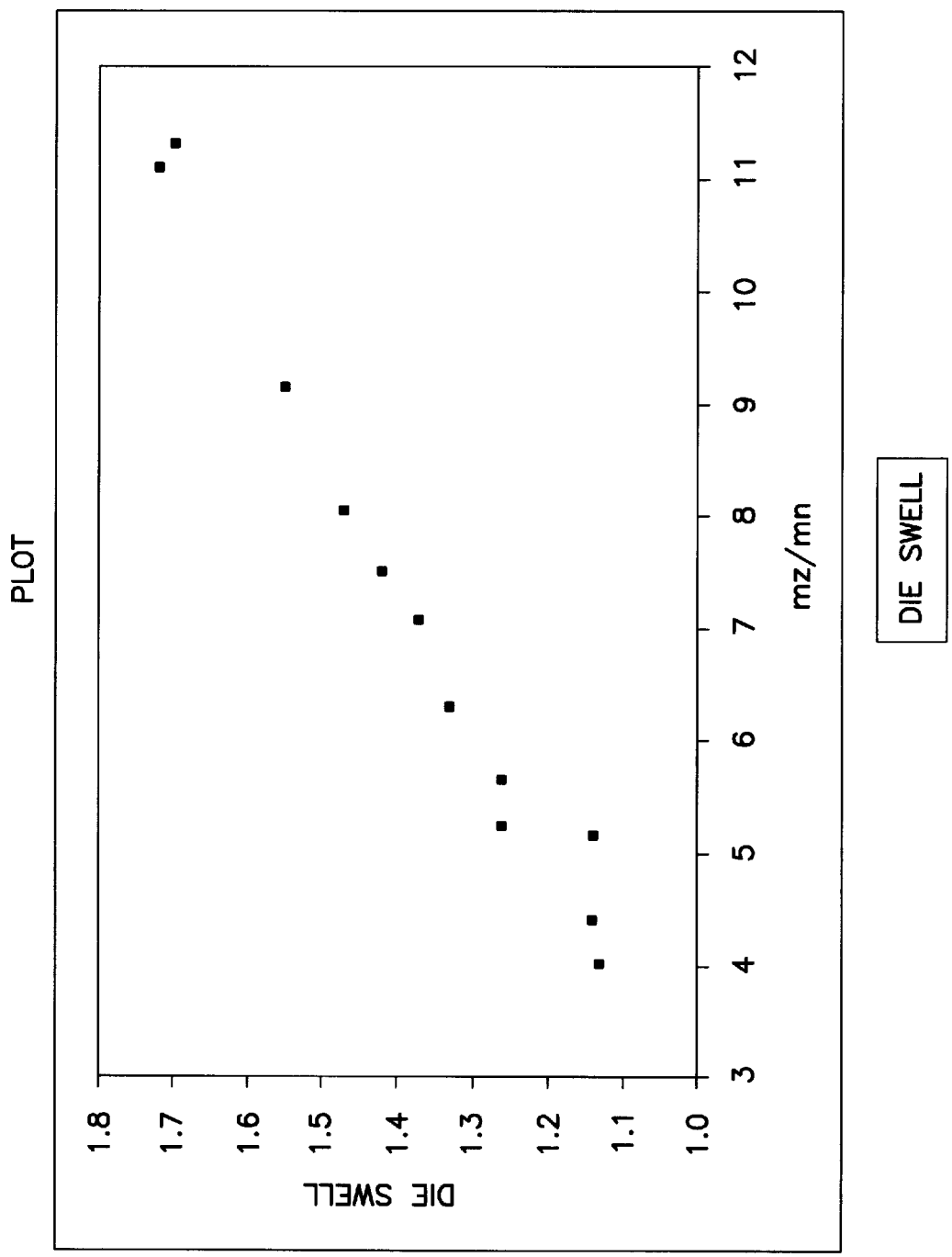
FIG. 9 is a graph showing the relationship between die swell and Mz/Mn for polylactide polymers.

Results are shown in the attached Table 2 and in FIGS. 8 and 9. The data show that neck-in is strongly correlated to die swell, with less neck-in at higher levels of die swell (FIG. 8). The data also show that die swell is strongly correlated to Mz/Mn (FIG. 9). The data also show the dramatic increase in Mz/Mn when crosslinking with peroxide, resulting from an increase in the higher molecular weight components. Neck-in is dramatically reduced.

TABLE 2

Effect of Peroxide Modification on Properties of Various PLA Grades

| Resin | % Active | MFI | Die Swell | neckin | Mn | Mw | Mw/Mn | Mz |
|---|---|---|---|---|---|---|---|---|
| A | 0 | 16.4 | 1.13 | 3.9 | 72300 | 153900 | 2.13 | 290300 |
|  | 0.05 | 13 | 1.26 | 3.5 | 74500 | 181400 | 2.43 | 420300 |
|  | 0.1 | 13 | 1.37 | 3.1 | 74400 | 199100 | 2.68 | 525400 |
| B | 0 | 13.7 | 1.14 | 3.6 | 71700 | 175900 | 2.45 | 369300 |
|  | 0.05 | 8.3 | 1.55 | 2.9 | 72800 | 230500 | 3.17 | 665900 |
|  | 0.1 | 7.5 | 1.7 | 2.6 | 71900 | 257200 | 3.58 | 811200 |
| C | 0 | 7.2 | 1.14 | 3.4 | 81900 | 181200 | 2.21 | 359100 |
|  | 0.05 | 6.3 | 1.33 | 3.4 | 84100 | 220300 | 2.62 | 529500 |
|  | 0.1 | 6.8 | 1.47 | 3.0 | 83800 | 241000 | 2.88 | 673000 |
| D | 0 | 4.3 | 1.26 | 3.2 | 86200 | 212600 | 2.47 | 450900 |
|  | 0.05 | 6.6 | 1.42 | 2.9 | 90400 | 260100 | 2.88 | 678000 |
|  | 0.1 | 4.9 | 1.72 | 2.8 | 85300 | 304800 | 3.57 | 944700 |

| Resin | % Active | Mz/Mn | Mz + 1 | Mz + 1/Mn | % change Mn | % change Mw | % change Mz | % change Mz + 1 |
|---|---|---|---|---|---|---|---|---|
| A | 0 | 4.02 | 489300 | 6.77 |  |  |  |  |
|  | 0.05 | 5.64 | 815500 | 10.95 | 3.04 | 17.87 | 44.78 | 66.67 |
|  | 0.1 | 7.06 | 1061100 | 14.26 | 2.90 | 29.37 | 80.99 | 116.86 |
| B | 0 | 5.15 | 656000 | 9.15 |  |  |  |  |
|  | 0.05 | 9.15 | 1290600 | 17.73 | 1.53 | 31.04 | 80.31 | 96.74 |
|  | 0.1 | 11.28 | 1505700 | 20.94 | 0.28 | 46.22 | 119.66 | 129.53 |
| C | 0 | 4.38 | 650100 | 7.94 |  |  |  |  |
|  | 0.05 | 6.30 | 1022000 | 12.15 | 2.69 | 21.58 | 47.45 | 57.21 |
|  | 0.1 | 8.03 | 1298600 | 15.50 | 2.32 | 33.00 | 87.41 | 99.75 |
| D | 0 | 5.23 | 807400 | 9.37 |  |  |  |  |
|  | 0.05 | 7.50 | 1262000 | 13.96 | 4.87 | 22.34 | 50.37 | 56.30 |
|  | 0.1 | 11.08 | 1653700 | 19.39 | −1.04 | 43.37 | 109.51 | 104.82 |

EXAMPLE 7

Effect of Peroxide Level on Mol. Wt. Distribution

A resin, prepared in a manner similar to the previous example, was treated with three different levels of peroxide (Varox DBPH-50, from R. T. Vanderbilt Co., 45% 2,5-dimethyl-2,5-di(t-butylperoxy)hexane on an inert filler). In addition to the peroxide, 1000 ppm of Aluminum Stearate and 500 ppm of tartaric acid were added. The materials (except for the control) were dry blended and reacted in an extruder at 180° C., as in the previous example. The results are shown in Table 3. The data show a modest change in the number average molecular weight but a dramatic increase in weight average, Z-average, and Z+1 average molecular weights. The increase in the higher averages is directly in response to the amount of the peroxide added. The die swell increased with the increase in Mz/Mn, indicating improved properties for the extrusion coating operations. Melt flow index (MFI) decrease slightly with increasing peroxide level.

The GPC results were used to determine in more detail where the molecular weight changes were occurring. The data show that the low molecular weight fraction (<10,000 AMU) remained at a low level (2.5 wt % of less) for all of the samples. The very high molecular weight fraction (>500,000 AMU) increased steadily with increasing level of peroxide treatment, going from 4.6 wt % in the base material to 12.3 wt % at the highest level of treatment.

on conditions. The paper was a 50 lb Kraft paper stock. The die width was 28 inches and a resin output of 170 lb/hr was supplied using two extruders (a 2-inch single screw at 80 rpm and a 2.5 inch single screw at 60 rpm) feeding the single die, giving a throughput of 6 pounds per hour per inch of die (pph/in). The air gap was adjusted to 3 inches, which was as low as practicable. Generally a smaller air gap allows for good adhesion at lower melt temperatures, reducing the thermal stress to the polymer.

Each of the resins was processed at the temperature specified in Table 4 and at a variety of linespeeds (reported in feet per minute). The extruder power load and head pressure are reported and show a slight increase in power requirement and head pressure for the higher levels of peroxide treatment, although increasing the melt temperature helps to moderate this effect. Power load and head pressure can be critical factors when extruding polylactide resins, and only modest increases, such as shown here, can be tolerated.

Coating tests, indicated by % neck-in (calculated as 100*(die width-coated width)/die width) and TAPPI adhesion (tape-pull test, with 5 indicating complete adhesion and 1 indicating no adhesion of the coating to paper), and comments indicating the presence of excessive edge weave (¼ inch or more) are also shown in the table.

Looking first at the base resins (A and D) shows the line speed maximum of about 200 fpm before edge wave is

TABLE 3

Effect of Various Peroxide Amounts on Polymer Properties and Mol. Wt. Distribution

| % Active Peroxide | MFI | Die Swell | Mn | Mw | Mw/Mn | Mz | Mz/Mn | Mz + 1 |
|---|---|---|---|---|---|---|---|---|
| 0 | 13.9 | 1.1 | 84300 | 181100 | 2.15 | 328300 | 3.89 | 543600 |
| 0.1 | 12.1 | 1.36 | 79530 | 210600 | 2.65 | 513600 | 6.46 | 981400 |
| 0.15 | 12.3 | 1.55 | 81400 | 234700 | 2.88 | 640700 | 7.87 | 1205300 |
| 0.2 | 8.5 | 1.7 | 81700 | 257200 | 3.15 | 746700 | 9.14 | 1356100 |
| % Active Peroxide | Mz + 1/Mn | % change Mn | % change Mw | % change Mz | % change Mz + 1 | % mol. wt <10,000 | % mol. wt >500,000 | |
| 0 | 6.45 | | | | | 2.4 | 4.6 | |
| 0.1 | 12.34 | −5.66 | 16.29 | 56.44 | 80.54 | 2.5 | 8.5 | |
| 0.15 | 14.81 | −3.44 | 29.60 | 95.16 | 121.73 | 1.6 | 10.6 | |
| 0.2 | 16.60 | −3.08 | 42.02 | 127.44 | 149.47 | 1.6 | 12.3 | |

EXAMPLE 8

Paper Coating Trial with Various Resins

Two resins (A and D in table 4) were prepared in a manner similar to Example 6. These resins were then modified by compounding in a twin screw extruder with either 0.05 wt % or 0.10 wt % (peroxide basis) of Varox DBPH-50 from R. T. Vanderbilt Co. (45% 2,5-dimethyl-2,5-di(t-butylperoxy) hexane on an inert carrier) in a manner similar to Example 6. These resins are labeled B, C, E, and F in Table 4. The properties of the reins and the effect of the peroxide treatment are shown in the table, with results generally similar to those detailed in Examples 6 and 7. In particular, the peroxide treatment effectively increased die swell, and Mz/Mn with smaller changes in Mn.

The dried, crystallized reins were processed on a paper coating line to produce a coating of 0.6–1.2 mils, depending noticeable, with about 17% neck-in. In comparison, the peroxide treated resins were processed at speeds up to at least 300 fpm and in some cases 450 fpm without edge weave, and with only 11–16% neck-in. These are significant improvements in terms of throughput of a paper coating line and in terms of reducing the polymer and paper waste associated with neck-in. The adhesion, in all cases, is reduced as the line speed increases. The peroxide coated resins show comparable adhesion to the base case resins at comparable speeds, except for resin F which was processed at a higher temperature. The higher temperature operation is seen to increase the adhesion. Actual maximum line speed will be higher for larger scale equipment and better adhesion will be obtained at larger polymer throughput rates.

TABLE 4

Paper Coating Trial with Various Grades of PLA Peroxide Modified Resins

| Resin | % Active | MFI | Die Swell | Mn | Mw | Mn/Mw | Mz | Mz/Mn | Mz + 1 | Mz + 1/Mn | % change Mn |
|---|---|---|---|---|---|---|---|---|---|---|---|
| A | 0 | 28 | 1.16 | 68000 | 139600 | 2.05 | 239000 | 3.51 | 384000 | 5.35 | |
| B | 0.05 | 16 | 1.31 | 72300 | 177300 | 2.45 | 378700 | 5.21 | 667000 | 9.23 | 6.32 |
| C | 0.1 | 14 | 1.41 | 77500 | 199000 | 2.57 | 473000 | 6.10 | 900000 | 11.61 | 13.97 |
| D | 0 | 12 | 1.12 | 83700 | 175500 | 2.10 | 305000 | 3.64 | 466500 | 5.57 | |
| E | 0.05 | 8.4 | 1.36 | 88800 | 226600 | 2.55 | 520000 | 5.86 | 984600 | 10.86 | 6.09 |
| F | 0.1 | 7.4 | 1.5 | 85400 | 246700 | 2.89 | 623000 | 7.30 | 1151000 | 13.48 | 2.03 |

| Resin | % Active | % change Mw | % change Mz | % change Mz + 1 | Extruder Amps | Extruder Pressure (psi) | Melt Temp (F) | Line-speed (fpm) | % neckin | Comments | TAPPI Adhesion |
|---|---|---|---|---|---|---|---|---|---|---|---|
| A | 0 | | | | 34 | 1980 | 504 | 150 | 16 | | 4 |
| | | | | | | | | 200 | 17 | | 3 |
| | | | | | | | | 250 | 19.6 | edge weave | 2 |
| | | | | | | | | 300 | 22.3 | edge weave | 1 |
| B | 0.05 | 27.01 | 57.62 | 83.24 | 37 | 2130 | 507 | 150 | 13 | | 4 |
| | | | | | | | | 200 | 14 | | 3 |
| | | | | | | | | 250 | 15 | | 2 |
| | | | | | | | | 300 | 16 | | 1 |
| C | 0.1 | 42.55 | 97.91 | 147.25 | 38 | 2190 | 508 | 150 | 11 | | 4 |
| | | | | | | | | 200 | 12 | | 3 |
| | | | | | | | | 250 | 14 | | 2 |
| | | | | | | | | 300 | 14 | | 1 |
| | | | | | | | | 350 | 14 | | 1 |
| | | | | | | | | 400 | 14 | | 1 |
| | | | | | | | | 450 | 15 | | 1 |
| D | 0 | | | | 45 | 2750 | 508 | 150 | 15 | | 4 |
| | | | | | | | | 200 | 16.8 | | 3 |
| | | | | | | | | 250 | 17.4 | sl. edge weave | 3 |
| | | | | | | | | 300 | 18.6 | edge weave | 2 |
| E | 0.05 | 29.12 | 70.49 | 106.77 | 47 | 2900 | 512 | 150 | 14 | | 4 |
| | | | | | | | | 200 | 14 | | 3 |
| | | | | | | | | 250 | 15 | | 2 |
| | | | | | | | | 300 | 15 | | 1 |
| F | 0.1 | 40.57 | 104.28 | 146.73 | 47 | 2000 | 533 | 150 | 14 | | 5 |
| | | | | | | | | 200 | 15 | | 4 |
| | | | | | | | | 250 | 15 | | 3 |
| | | | | | | | | 300 | 16 | | 1 |
| | | | | | | | | 350 | 16 | edge weave | 1 |

While the invention has been described in conjunction with several specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the claims.

What is claimed is:

1. A method for coating paper, the method comprising steps of:
   (a) melting a polylactide polymer composition in an extruder to provide a melted polylactide polymer composition at a temperature of between about 495° F. and about 540° F.; said polylactide polymer composition comprising:
      (i) peroxide modified polylactide polymer having an optical purity of S-lactic acid repeating units of greater than about 90% and resulting from compounding polylactide polymer and peroxide at a weight percent of peroxide of between about 0.005 wt. % and about 5 wt. %;
      (ii) residual lactide level of less than about 1 wt. %;
      (iii) the polylactide polymer has a weight average molecular weight of between about 80,000 and about 300,000;
      (iv) the polylactide polymer has a ratio of Mz to Mn of greater than about 6; and
      (v) the polylactide polymer has a polydispersity index of greater than about 2.5;
   (b) extrusion coating the melted polylactide polymer composition from the extruder and onto a paper layer at a line speed of between about 500 ft/min and about 2000 ft/min to provide a coated paper product comprising a paper layer and a polymer layer, the polymer layer comprising the extrusion coated polylactide polymer composition; and
   (c) pressing the coated paper product between a nip roller and a chill roller to enhance adhesion between the paper layer and the polymer layer, wherein the chill roller contacts the polylactide polymer composition and has a surface temperature of less than about 130° F.

2. A method for coating paper according to claim 1, wherein said step of extrusion coating comprises:
   (a) applying the polylactide polymer composition at a flow rate of between about 5 lb/hr per inch of die width to about 25 lb/hr per inch of die width.

3. A method for coating paper according to claim 1, wherein said step of extrusion coating comprises:
   (a) extruding polylactide polymer composition through a die having a die width of about two feet to about ten feet.

4. A method for coating paper according to claim 1, wherein said step of extrusion coating comprises:

(a) extruding the polylactide polymer composition through a die having a die outlet and providing an air gap between the paper layer and the die outlet of less than about four inches.

5. A method for coating paper according to claim 1, wherein the step of extrusion coating comprises:
   (a) processing the polylactide polymer composition through a die having a die gap of between about 15 mils and about 30 mils.

6. A method for coating paper according to claim 1, wherein the step of extrusion coating comprises:
   (a) processing the polylactide polymer composition through a die having a die gap of between about 18 mils and about 25 mils.

7. A method for coating paper according to claim 1, wherein the step of extrusion coating comprises:
   (a) melting the polylactide polymer composition at a temperature of between about 500° F. and about 530° F.

8. A method for coating paper according to claim 1, wherein the step of extrusion coating comprises:
   (a) coating the paper layer at a line speed of between about 500 ft/min. and about 1,500 ft/min.

9. A method for coating paper according to claim 1, further comprising a step of:
   (a) feeding pellets comprising the polylactide polymer composition to an extruder for said step of extrusion coating.

10. A method for coating paper according to claim 9, wherein said pellets comprise semi-crystalline polylactide polymer having a crystallinity of greater than 10 J/g.

11. A method for coating paper according to claim 10, uther comprising a step of:
    (a) drying the polylactide polymer composition at a temperature of about 60° C. to about 130° C. prior to the step of feeding the pellets to the extruder.

12. A method for coating paper according to claim 1, wherein said peroxide comprises alkyl peroxide.

13. A method for coating paper according to claim 1, wherein the polymer layer of said coated paper product comprises amorphous polylactide polymer composition.

14. A method for coating paper according to claim 1, wherein the polymer layer of said coated paper product has a surface exhibiting a surface energy of between about 38 dynes/cm and 44 dynes/cm.

15. A method for coating paper according to claim 1, wherein the polymer layer of said coated paper product has a surface exhibiting a surface energy between 45 dynes/cm and 50 dynes/cm.

16. A method for coating paper according to claim 1, wherein said peroxide modified polylactide polymer is a result of compounding polylactide polymer and peroxide at a weight percent of peroxide of between about 0.03 wt % and about 1.5 wt %.

17. A method for coating paper according to claim 1, wherein said peroxide modified polylactide polymer has an optical purity of S-lactic acid repeating units of greater than about 95%.

18. A method for coating paper according to claim 1, wherein the peroxide modified polylactide polymer is prepared by compounding polylactide polymer and between about 0.005 wt. % and about 0.03 wt. %, based on the total weight of the composition, of peroxide.

19. A method for coating paper according to claim 1, wherein the polylactide polymer comprises a reaction product of epoxidized soy bean oil.

20. A method for coating paper according to claim 1, wherein the polylactide polymer composition has a ratio of Mz to Mn of greater than about 7.

21. A method for coating paper according to claim 1, wherein the polylactide polymer has a die swell of greater than about 1.25 for melt flow index of greater than about 2.

22. A method for coating paper according to claim 1, wherein the polylactide polymer has a die swell of greater than about 1.4 for a melt flow index of greater than about 2.

23. A method for coating paper according to claim 1, wherein the polylactide polymer composition comprises a tackifying resin.

24. A method for coating paper according to claim 1, wherein the polylactide polymer composition has a weight average molecular weight of between about 100,000 and about 250,000.

25. A method for coating paper according to claim 1, wherein the polylactide polymer composition comprises at least about 70% by weight polylactide polymer.

26. A method for coating paper according to claim 1, wherein the polylactide polymer composition has a melt flow index of between about 8 and about 20 as measured by ASTM D1238-95 at 210° C. and 2.16 kg.

27. A method for coating paper according to claim 1, wherein the polylactide polymer composition comprises polylactide polymer having an optical purity of S-lactic acid residuals between about 92% and 98%.

28. A method for coating paper according to claim 1, wherein the polylactide polymer composition has a residual lactide concentration of less than about 0.5 wt %.

29. A method for coating paper according to claim 1, wherein the polylactide polymer composition comprises a carboxylic acid containing stabilizing agent.

30. A method for coating paper according to claim 1, wherein the polylactide polymer composition comprises a lubricant selected from the group of fluoropolymer powders, graphite, fatty acid esters, hydrocarbon waxes, and mixtures thereof.

31. A method for coating paper according to claim 1, wherein the polylactide polymer composition comprises a lubricant selected from the group of fatty acid esters, amides, metal salts and soaps, paraffm, hydrocarbon waxes, and mixtures thereof.

32. A method for coating paper according to claim 1, wherein the paper layer has a first surface and a second surface, the polymer layer is a first polymer layer adhered to the first surface of the paper layer, and the method firther comprises a step of adhering a second polymer layer to the second surface of the paper layer.

33. A method for coating paper according to claim 1, wherein the paper layer has a first surface and a second surface, the polymer layer is a first polymer layer adhered to the first surface of the paper layer, and the method further comprises a step of adhering a second polymer layer to the first polymer layer.

34. A method for coating paper according to claim 1, wherein said paper layer includes a first surface and a second surface, the polymer layer comprises a first polymer layer, and the method comprises adhering the first polymer layer to a second polymer layer adhered to the first surface of the paper layer.

35. A method for coating paper according to claim 32, wherein the second polymer layer comprises a polylactide polymer.

36. A method for coating paper according to claim 33, wherein the second polymer layer comprises a polylactide polymer.

37. A method for coating paper according to claime 34, wherein the second polymer layer comprises polylactide polymer.

38. A method for coating paper according to claim 32, wherein the second polymer layer has a number average molecular weight different from the number average molecular weight of the first polymer layer.

39. A method for coating paper according to claim 34, wherein the second polymer layer is selected to provide adhesion between said paper layer and said first polymer layer.

40. A method for coating paper according to claim 32, wherein the coated paper product provides a grease resistance property of no penetration after 65 hours at 100° C. according to test method ASTM F119.

41. A method for coating paper according to claim 32, wherein the second polymer layer comprises a polymer selected from the group lactic acid containing polymers, polyvinyl acetate, polypropiolactone cellulose acetates, glycolide-containing polymers, aliphatic polyesters, polyhydroxy propionate, polyester amides, aliphatic diol polymers, aliphatic dicarboxylic acids, aromatic dicarboxylic acids, and blends thereof.

42. A method for coating paper according to claim 1, firther comprising a step of:
   (a) providing the coated paper product in the form of an article selected from the group consisting of boxes, cups, plates, butter wraps, margerine wraps, pet food sacks, pet food boxes, hamburger wraps, multi-wall sacks, lawn refuse bags, and butcher wraps.

43. A method for coating paper, the method comprising steps of:
   (a) melting a polylactide polymer composition in an extruder to provide a melted polylactide polymer composition at a temperature of between about 495° F. and about 540° F.; said polylactide polymer composition comprising:
      (i) peroxide modified polylactide polymer having an optical purity of S-lactic acid repeating units of greater than about 90% and resulting from compounding polylactide polymer and peroxide at a weight percent of peroxide of between about 0.005 wt. % and about 5 wt. %;
      (ii) residual lactide level of less than about 1 wt. %;
      (iii) the polylactide polymer has a weight average molecular weight of between about 80,000 and about 300,000;
      (iv) the polylactide polymer has a ratio of Mz to Mn of greater than about 6; and
      (v) the polylactide polymer has a polydispersity index of greater than about 2.5;
   (b) extrusion coating the melted polylactide polymer composition from the extruder and onto a paper layer at a polylactide polymer composition flow rate of between about 5 lb/hr per inch of die width to about 25 lb/hr per inch of die width to provide a coated paper product comprising a paper layer and a polymer layer, the polymer layer comprising the extrusion coated polylactide polymer composition; and
   (c) pressing the coated paper product between a nip roller and a chill roller to enhance adhesion between the paper layer and the polymer layer, wherein the chill roller contacts the polylactide polymer composition and has a surface temperature of less than about 130° F.

44. A method for coating paper according to claim 43, further comprising the step of:
   (a) feeding pellets comprising the polylactide polymer composition to the extruder prior to the step of melting.

45. A method for coating paper according to claim 44, wherein the pellets comprise semicrystalline polylactide polymer having crystallinity of greater than 10 J/g.

* * * * *

UNITED STATES PATENT AND TRADEMARK OFFICE
CERTIFICATE OF CORRECTION

PATENT NO.    : 6,183,814 B1
DATED         : February 6, 2001
INVENTOR(S)   : Nangeroni et al.

It is certified that error appears in the above-identified patent and that said Letters Patent is hereby corrected as shown below:

Title page,
Item [56], References Cited, U.S. PATENT DOCUMENTS, insert:
-- 5,798,436   8/1998   Gruber et al.   528/354 --
OTHER PUBLICATIONS, insert -- ; -- after "Germany"

Column 2,
Line 20, "forms" should read -- form --

Column 5,
Line 34, "pplication" should read -- application --

Column 7,
Line 34, insert -- to -- after "meant"
Line 49, "possess" should read -- possesses --

Column 9,
Line 28, delete "of the"

Column 10,
Line 10, delete "Alla"

Column 11,
Line 27, ",through" should read -- through --
Line 37, "includes" should read -- include --

Column 15,
Line 50, "polydisperisty" should read -- polydispersity --

Column 16,
Line 3, delete "a" before "210ºC"
Line 20, insert -- a -- before "melt flow"
Line 21, insert -- a -- before "melt flow"

Column 18,
Line 9, "600º" should read -- 60º --

Column 22,
Line 41, insert -- are -- after "probabilities"

UNITED STATES PATENT AND TRADEMARK OFFICE
CERTIFICATE OF CORRECTION

PATENT NO. : 6,183,814 B1
DATED : February 6, 2001
INVENTOR(S) : Nangeroni et al.

It is certified that error appears in the above-identified patent and that said Letters Patent is hereby corrected as shown below:

Column 23,
Line 5, insert -- ) -- after "J/g"

Column 24,
Line 1, insert -- an -- before "in-line"
Line 3, "levels" should read -- level --
Line 43, "viscosity, increased" should read -- viscosity and increased --

Column 25,
Line 16, "including," should read -- including --
Line 52, "plasticizer" should read -- plasticizers --
Line 56, "plasticizer" should read --plasticizers--
Line 57, insert -- and -- before "Citroflex C-4®"

Column 26,
Line 4, "plasticizer," should read -- plasticizers, --
Line 6, "plasticizer" should read -- plasticizers --

Column 27,
Line 3, insert -- be -- before "more"
Line 7, "desirably" should read -- desirable --
Lines 9-10, "semic-rystalline" should read -- semi-crystalline --
Line 37, "particulats." should read -- particulates. --

Column 28,
Lines 2-6, "Zinc stearate, Calcium stearate, Aluminum stearate, stearic acetiatic, White Beeswax, Candelia Wax," should read -- zinc stearate, calcium stearate, aluminum stearate, stearic acetiatic, white beeswax, candelia wax, --
Line 11, "surfacants" should read -- surfactants --
Line 19, "quaternzation" should read -- quaternization --
Line 30, "Surfacants" should read -- Surfactants --
Line 55, insert -- and -- before "low"

UNITED STATES PATENT AND TRADEMARK OFFICE
CERTIFICATE OF CORRECTION

PATENT NO. : 6,183,814 B1
DATED : February 6, 2001
INVENTOR(S) : Nangeroni et al.

It is certified that error appears in the above-identified patent and that said Letters Patent is hereby corrected as shown below:

Column 29,
Line 2, "to:SnCl$_2$," should read -- to: SnCl$_2$, --
Line 14, "of" should read -- Of --

Column 30,
Line 25, "polyethylene," should read -- polyethylene and --
Line 31, "e.a.,lactic" should read -- e.g., lactic --

Column 31,
Line 17, "scalability" should read -- sealability --

Column 32,
Line 1, "form" should read -- from --

Column 34,
Line 25, "a eight" should read -- an eight --

Column 35,
Line 19, "decrease" should read -- decreased --
Line 60, "reins" should read -- resins --
Line 66, "reins" should read -- resins --

Column 39,
Line 34, "uther" should read -- further --

Column 40,
Line 33, "acid containing" should read -- acid-containing --
Line 42, "paraffm" should read -- paraffin --
Line 47, "firther" should read -- further --

UNITED STATES PATENT AND TRADEMARK OFFICE
CERTIFICATE OF CORRECTION

PATENT NO.    : 6,183,814 B1
DATED         : February 6, 2001
INVENTOR(S)   : Nangeroni et al.

It is certified that error appears in the above-identified patent and that said Letters Patent is hereby corrected as shown below:

Column 41,
Line 1, "claime" should read -- claim --
Line 25, "firther" should read -- further --
Line 28, "margerine" should read -- margarine --

Signed and Sealed this

Tenth Day of December, 2002

JAMES E. ROGAN
*Director of the United States Patent and Trademark Office*